(12) United States Patent
Saruta et al.

(10) Patent No.: US 11,656,370 B2
(45) Date of Patent: May 23, 2023

(54) RADIATION IMAGING PANEL, RADIATION IMAGING APPARATUS, RADIATION IMAGING SYSTEM, METHOD OF MANUFACTURING RADIATION IMAGING PANEL, AND SCINTILLATOR PLATE

(71) Applicant: CANON KABUSHIKI KAISHA, Tokyo (JP)

(72) Inventors: Shoshiro Saruta, Tokyo (JP); Kazumi Nagano, Tokyo (JP); Keiichi Nomura, Kanagawa (JP); Tetsunori Ojima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 17/379,228

(22) Filed: Jul. 19, 2021

(65) Prior Publication Data
US 2022/0026590 A1 Jan. 27, 2022

(30) Foreign Application Priority Data

Jul. 27, 2020 (JP) .............................. JP2020-126726
Aug. 27, 2020 (JP) .............................. JP2020-143836
Aug. 27, 2020 (JP) .............................. JP2020-143837

(51) Int. Cl.
*G01T 1/20* (2006.01)
*G01T 1/29* (2006.01)
*G01T 1/202* (2006.01)

(52) U.S. Cl.
CPC .......... *G01T 1/2002* (2013.01); *G01T 1/2023* (2013.01); *G01T 1/2928* (2013.01)

(58) Field of Classification Search
CPC .... G01T 1/2002; G01T 1/2023; G01T 1/2928
See application file for complete search history.

(56) References Cited

U.S. PATENT DOCUMENTS

| 7,256,404 | B2 | 8/2007 | Inoue et al. |
| 7,514,686 | B2 | 4/2009 | Ogawa et al. |
| 7,595,493 | B2 | 9/2009 | Okada et al. |
| 8,653,465 | B2 | 2/2014 | Nagano et al. |
| (Continued) | | | |

FOREIGN PATENT DOCUMENTS

JP 2006-052980 A 2/2006

OTHER PUBLICATIONS

Thomas P. Flanagan, "Re-evaluating Hot Melt Adhesives," 9(3) Adhesives Age 28-31 (Mar. 1966).
Saruta et al., U.S. Appl. No. 17/366,272, filed Jul. 2, 2021.

*Primary Examiner* — Hugh Maupin
(74) *Attorney, Agent, or Firm* — Venable LLP

(57) ABSTRACT

A radiation imaging panel comprising a substrate in which a plurality of pixels each including a photoelectric conversion element are arranged, a scintillator containing a plurality of columnar crystals arranged on the substrate, and a protective layer is provided. The protective layer includes a first resin layer arranged so as to cover the scintillator and a second resin layer arranged on the first resin layer, and the first resin layer contains a resin to which particles of a metal compound is added. A light reflectance r1 [%] of the first resin layer satisfies 47%<r1<75%, and a light reflectance r2 [%] of the second resin layer and a light absorptance a2 [%] of the second resin layer satisfy r2<a2.

80 Claims, 16 Drawing Sheets

(56) References Cited

U.S. PATENT DOCUMENTS

| | | |
|---|---|---|
| 8,779,369 B2 | 7/2014 | Ichimura et al. |
| 9,568,614 B2 | 2/2017 | Ishida et al. |
| 2014/0239196 A1* | 8/2014 | Shoji ................... G02B 5/0278 250/488.1 |
| 2019/0004186 A1* | 1/2019 | Kotake ................ G01T 1/2002 |
| 2020/0081140 A1 | 3/2020 | Ojima |

* cited by examiner

F I G. 1
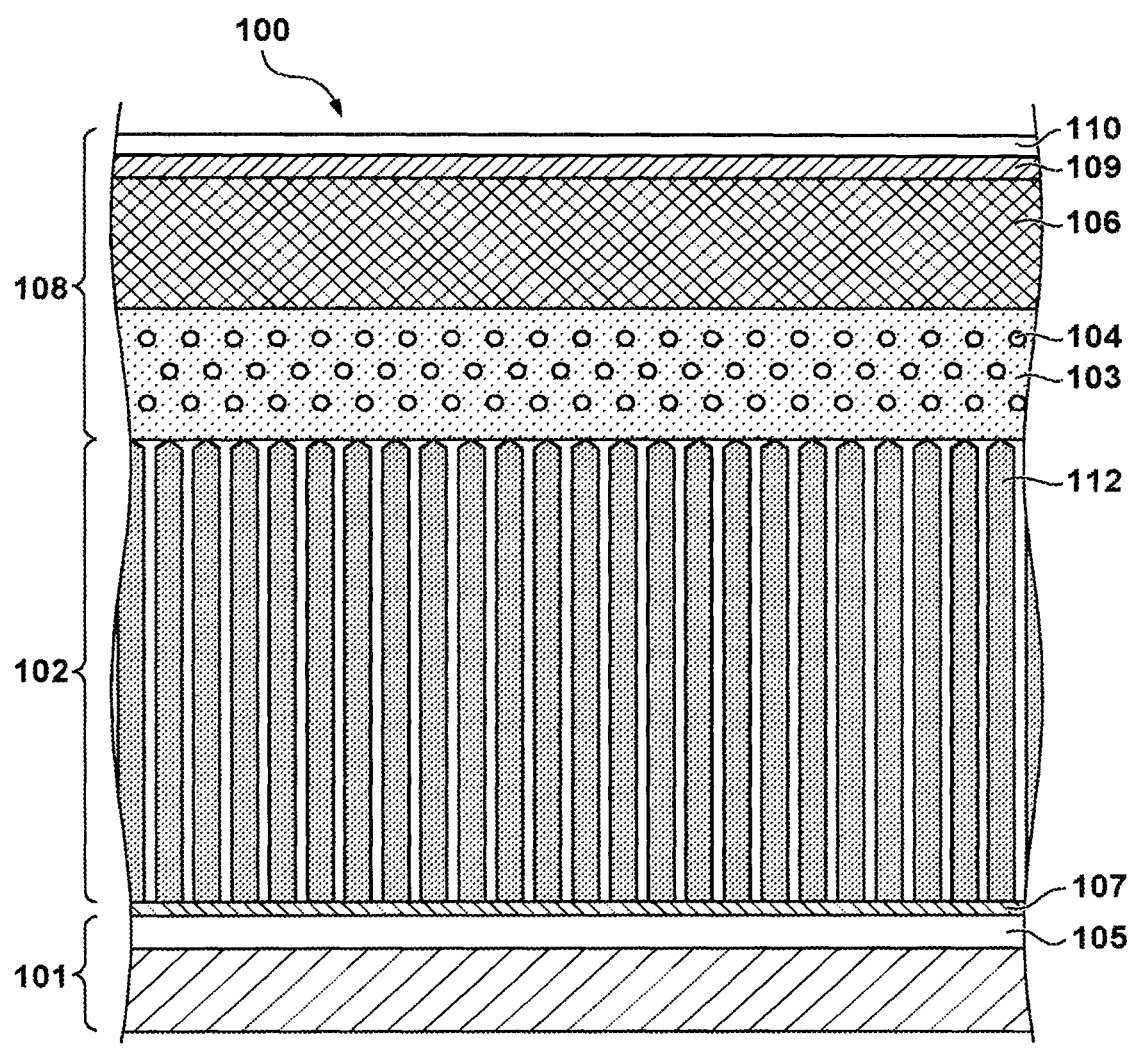

FIG. 6A

| | FIRST RESIN LAYER 103 | | | SECOND RESIN LAYER 106 | | | |
|---|---|---|---|---|---|---|---|
| | ARRANGEMENT | REFLECTANCE r1 | REFRACTIVE INDEX n1 | ARRANGEMENT | ABSORPTANCE a2 | REFLECTANCE r2 | REFRACTIVE INDEX n2 |
| COMPARATIVE EXAMPLE 1 | HOT MELT RESIN | 4.1 | 1.52 | Al/PET | 14.6 | 85.4 | 1.48 |
| EXAMPLE 1 | HOT MELT RESIN WITH RUTILE TITANIUM DIOXIDE ADDED | 37.6 | 1.52 | HOT MELT RESIN WITH CARBON BLACK ADDED | 14.6 | 14.5 | 1.52 |
| 2 | | | | | 30.0 | 12.7 | |
| 3 | | | | | 50.0 | 10.2 | |
| 4 | | | | | 70.0 | 7.7 | |
| 5 | | | | | 94.6 | 5.4 | |
| 6 | | | | | 97.6 | 2.4 | |
| 7 | | 48.9 | | | 14.6 | 14.5 | |
| 8 | | | | | 30.0 | 12.7 | |
| 9 | | | | | 50.0 | 10.2 | |
| 10 | | | | | 70.0 | 7.7 | |
| 11 | | | | | 94.6 | 5.4 | |
| 12 | | | | | 97.6 | 2.4 | |
| 13 | | 60.3 | | | 14.6 | 14.5 | |
| 14 | | | | | 30.0 | 12.7 | |
| 15 | | | | | 50.0 | 10.2 | |
| 16 | | | | | 70.0 | 7.7 | |
| 17 | | | | | 94.6 | 5.4 | |
| 18 | | | | | 97.6 | 2.4 | |
| 19 | | 74.6 | | | 14.6 | 14.5 | |
| 20 | | | | | 30.0 | 12.7 | |
| 21 | | | | | 50.0 | 10.2 | |
| 22 | | | | | 70.0 | 7.7 | |
| 23 | | | | | 94.6 | 5.4 | |
| 24 | | | | | 97.6 | 2.4 | |
| 25 | | 90.6 | | | 14.6 | 14.5 | |
| 26 | | | | | 30.0 | 12.7 | |
| 27 | | | | | 50.0 | 10.2 | |
| 28 | | | | | 70.0 | 7.7 | |
| 29 | | | | | 94.6 | 5.4 | |
| 30 | | | | | 97.6 | 2.4 | |

FIG. 6B

| | | Relationship between a2 and r2 | Relationship between r1 and r2 | Relationship between n1 and n2 | RQA 5 measurement result Sensitivity S (LSB) | MTF (2lp/mm) |
|---|---|---|---|---|---|---|
| COMPARATIVE EXAMPLE | 1 | a2<r2 | r1<r2 | n1>n2 | 11221 | 0.428 |
| EXAMPLE | 2 | a2>r2 | r1>r2 | n1=n2 | 13722 | 0.543 |
| | 3 | | | | 12621 | 0.560 |
| | 4 | | | | 11911 | 0.570 |
| | 5 | | | | 10621 | 0.590 |
| | 6 | | | | 9704 | 0.620 |
| | 7 | | | | 9405 | 0.624 |
| | 8 | | | | 13950 | 0.544 |
| | 9 | | | | 12800 | 0.550 |
| | 10 | | | | 12300 | 0.560 |
| | 11 | | | | 11000 | 0.570 |
| | 12 | | | | 10475 | 0.583 |
| | 13 | | | | 9962 | 0.579 |
| | 14 | | | | 13950 | 0.544 |
| | 15 | | | | 12800 | 0.550 |
| | 16 | | | | 12300 | 0.560 |
| | 17 | | | | 11000 | 0.570 |
| | 18 | | | | 10375 | 0.581 |
| | 19 | | | | 9562 | 0.579 |
| | 20 | | | | 18618 | 0.516 |
| | 21 | | | | 17968 | 0.510 |
| | 22 | | | | 17318 | 0.512 |
| | 23 | | | | 16742 | 0.513 |
| | 24 | | | | 15874 | 0.515 |
| | 25 | | | | 15697 | 0.513 |
| | 26 | | | | 18304 | 0.503 |
| | 27 | | | | 18310 | 0.504 |
| | 28 | | | | 18299 | 0.499 |
| | 29 | | | | 18306 | 0.502 |
| | 30 | | | | 18302 | 0.501 |
| | | | | | 18304 | 0.494 |

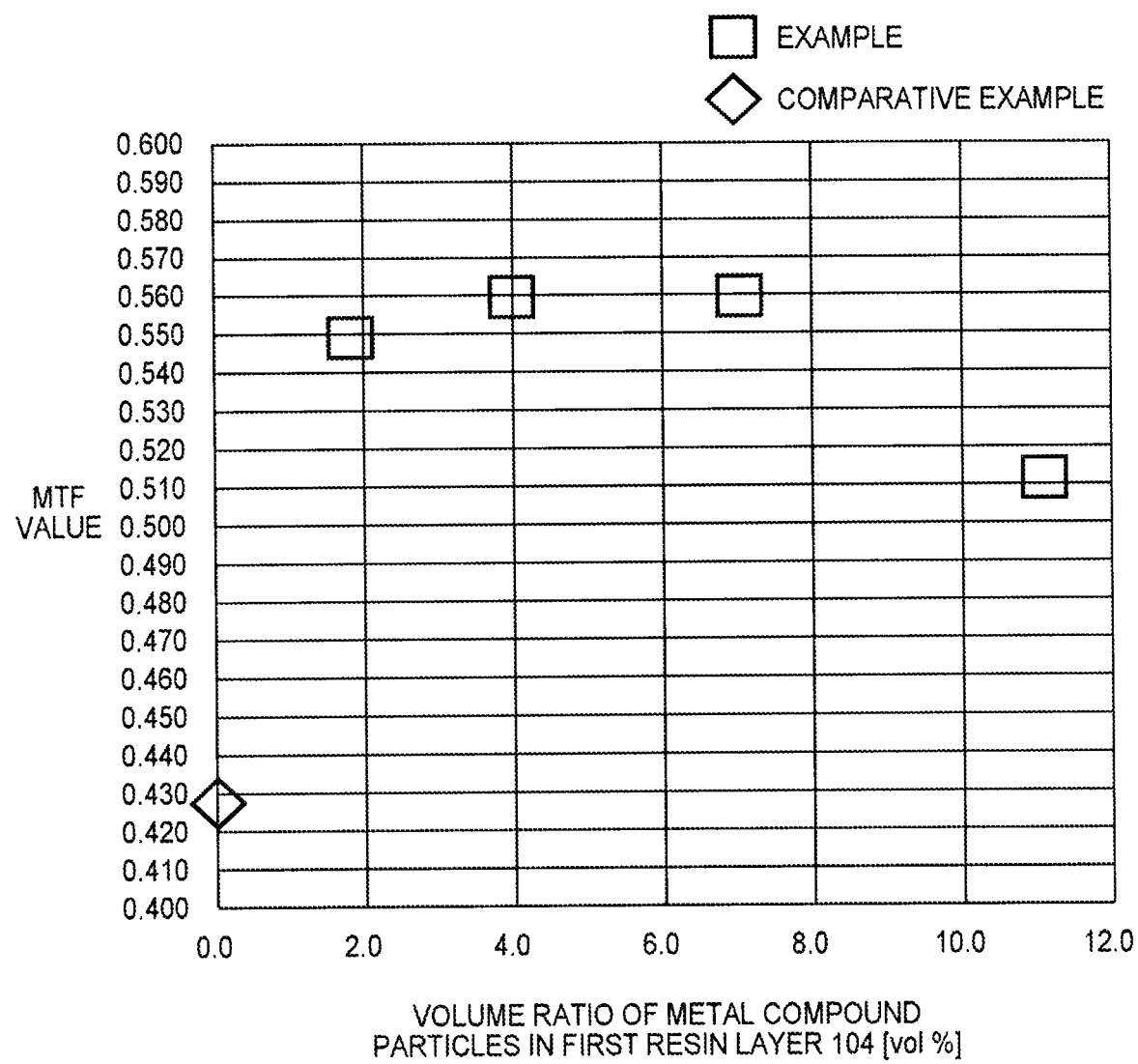

FIG. 9A

| | | SCINTILLATOR 102 | FIRST RESIN LAYER 103 | | | | |
|---|---|---|---|---|---|---|---|
| | | PEAK WAVELENGTH | ARRANGEMENT | REFRACTIVE INDEX n1 | AVERAGE PARTICLE DIAMETER (nm) | CONTENT (vol %) | FILM THICKNESS (μm) |
| COMPARATIVE EXAMPLE | 1 | CESIUM IODIDE 550 nm | HOT MELT RESIN | 1.52 | 0 | 0.0 | 30 |
| EXAMPLE | 2 | CESIUM IODIDE 550 nm | HOT MELT RESIN WITH RUTILE TITANIUM DIOXIDE ADDED | 1.52 | 225 | 1.8 | 30 |
| | 3 | | | | | 4.0 | |
| | 4 | | | | | 7.1 | |
| | 5 | | | | | 11.1 | |
| | 6 | | | | | 19.5 | |
| | 7 | | | | | 1.8 | |
| | 8 | | | | | 4.0 | |
| | 9 | | | | | 7.1 | |
| | 10 | | | | | 11.1 | |
| | 11 | | | | | 19.5 | |
| | 12 | | | | | 1.8 | |
| | 13 | | | | | 4.0 | |
| | 14 | | | | | 7.1 | |
| | 15 | | | | | 11.1 | |
| | 16 | | | | | 19.5 | |
| | 17 | | | | 225.0 | 7.1 | |
| | | | | | 150.0 | 7.1 | |

FIG. 9B

| | | SECOND RESIN LAYER 106 | | | | RQA 5 MEASUREMENT RESULT | |
|---|---|---|---|---|---|---|---|
| | ARRANGEMENT | REFRACTIVE INDEX n2 | AVERAGE PARTICLE DIAMETER (nm) | CONTENT (vol %) | FILM THICKNESS (μm) | SENSITIVITY S (LSB) | MTF (2lp/mm) |
| COMPARATIVE EXAMPLE 1 | HOT MELT RESIN | 1.52 | 0 | 0.0 | 30 | 11221 | 0.428 |
| EXAMPLE 2 | HOT MELT RESIN WITH RUTILE TITANIUM DIOXIDE ADDED | 1.52 | 225 | 7 | 30 | 13722 | 0.521 |
| 3 | | | 225 | 7 | 30 | 13950 | 0.544 |
| 4 | | | 225 | 7 | 30 | 13950 | 0.544 |
| 5 | | | 225 | 7 | 30 | 18618 | 0.516 |
| 6 | | | 225 | 7 | 30 | 18304 | 0.503 |
| 7 | | | 550 | 7 | 30 | 12621 | 0.545 |
| 8 | | | 550 | 7 | 30 | 12800 | 0.550 |
| 9 | | | 550 | 7 | 30 | 12800 | 0.550 |
| 10 | | | 550 | 7 | 30 | 17968 | 0.510 |
| 11 | | | 800 | 7 | 30 | 18310 | 0.504 |
| 12 | | | 800 | 7 | 30 | 11911 | 0.550 |
| 13 | | | 800 | 7 | 30 | 12300 | 0.560 |
| 14 | | | 800 | 7 | 30 | 12300 | 0.560 |
| 15 | | | 800 | 7 | 30 | 17318 | 0.512 |
| 16 | | | 225 | 7 | 30 | 18299 | 0.499 |
| 17 | | | 225 | 7 | 50 | 13950 | 0.555 |
| 18 | | | 550 | 7 | 30 | 11000 | 0.540 |

RADIATION IMAGING PANEL, RADIATION IMAGING APPARATUS, RADIATION IMAGING SYSTEM, METHOD OF MANUFACTURING RADIATION IMAGING PANEL, AND SCINTILLATOR PLATE

BACKGROUND OF THE INVENTION

Field of the Invention

The present invention relates to a radiation imaging panel, a radiation imaging apparatus, a radiation imaging system, a method of manufacturing the radiation imaging panel, and a scintillator plate.

Description of the Related Art

As a flat panel detector (FPD) to be used in radiography in, for example, a medical image diagnosis or nondestructive inspection, there is an indirect conversion type FPD that uses a scintillator to convert radiation, which has passed through an object, into light, and uses a photoelectric conversion element to detect the light emitted by the scintillator. In this scintillator for converting radiation into light, a columnar crystal of an alkali metal halide such as cesium iodide is widely used in order to efficiently transmit the light converted from the radiation to the photoelectric conversion element. Since the alkali metal halide will deteriorate due to moisture absorption, a protective layer having a moisture preventing function can be formed on the scintillator. Also, a reflection layer having a light reflecting function can be formed on the side of the scintillator, which is opposite to the photoelectric conversion element, so that the photoelectric conversion element can efficiently detect the light converted from the radiation by the scintillator. Japanese Patent Laid-Open No. 2006-052980 discloses a radiation detecting apparatus that includes a phosphor protecting layer which has a moisture preventing function and a light reflecting function with respect to a phosphor layer and is made of a resin containing fine light reflecting particles.

SUMMARY OF THE INVENTION

In the arrangement disclosed in Japanese Patent Laid-Open No. 2006-052980, if the light reflectance of the fine light reflecting particles or the light reflectance of the interface of the phosphor protecting layer is too high, some of the rays of light that entered the phosphor protecting layer from a columnar crystal may diffuse upon being repetitively reflected and scattered. Such rays of light may subsequently enter a columnar crystal which is different from the columnar crystal from which they were emitted. If the rays of light enter a columnar crystal which is different from the columnar crystal from which they were emitted, it can cause MTF (Modulation Transfer Function) degradation. On the other hand, if the light reflectance of the phosphor protecting layer is too low, some of the rays of light emitted from the columnar crystal to the phosphor protecting layer may reach the upper surface of the phosphor protecting layer and diffuse upon being reflected from the upper surface of the phosphor protecting layer to the side of the scintillator. This may degrade the MTF.

Some embodiments of the present invention provide a technique advantageous in improving the MTF in a radiation imaging panel.

According to some embodiments, a radiation imaging panel comprising a substrate in which a plurality of pixels each including a photoelectric conversion element are arranged, a scintillator containing a plurality of columnar crystals arranged on the substrate, and a protective layer, wherein the protective layer includes a first resin layer arranged so as to cover the scintillator and a second resin layer arranged on the first resin layer, the first resin layer contains a resin to which particles of a metal compound is added, a light reflectance r1 [%] of the first resin layer satisfies 47%<r1<75%, and a light reflectance r2 [%] of the second resin layer and a light absorptance a2 [%] of the second resin layer satisfy r2<a2, is provided.

According to some other embodiments, a scintillator plate comprising a substrate, a scintillator containing a plurality of columnar crystals arranged on the substrate, and a protective layer, wherein the protective layer includes a first resin layer arranged so as to cover the scintillator and a second resin layer arranged on the first resin layer, the first resin layer contains a resin to which particles of a metal compound is added, a light reflectance r1 [%] of the first resin layer satisfies 47%<r1<75%, and a light reflectance r2 [%] of the second resin layer and a light absorptance a2 [%] satisfy r2<a2, is provided.

According to still other embodiments, a radiation imaging panel comprising a substrate in which a plurality of pixels each including a photoelectric conversion element are arranged, a scintillator containing a plurality of columnar crystals arranged on the substrate, and a protective layer, wherein the protective layer includes a first resin layer arranged so as to cover the scintillator and a second resin layer arranged on the first resin layer, each of the first resin layer and the second resin layer contains particles of a metal compound, an average particle diameter $d_1$ of the particles contained in the first resin layer is a particle diameter which causes Rayleigh scatting of light of a peak wavelength emitted from the scintillator, and an average particle diameter $d_2$ of the particles contained in the second resin layer is a particle diameter which causes Mie scatting of the light of the peak wavelength emitted from the scintillator, is provided.

According to yet other embodiments, a scintillator plate comprising a substrate, a scintillator containing a plurality of columnar crystals arranged on the substrate, and a protective layer, wherein the protective layer includes a first resin layer arranged so as to cover the scintillator and a second resin layer arranged on the first resin layer, particles of a metal compound are added to each of the first resin layer and the second resin layer, an average particle diameter $d_1$ of the particles added to the first resin layer is a particle diameter which causes Rayleigh scatting of light of a peak wavelength emitted from the scintillator, and an average particle diameter $d_2$ of the particles added to the second resin layer is a particle diameter which causes Mie scatting of the light of the peak wavelength emitted from the scintillator, is provided.

According to further embodiments, a radiation imaging panel comprising a substrate formed by arranging a plurality of pixels each including a photoelectric conversion element on a principal surface, a scintillator containing a plurality of columnar crystals arranged on the principal surface, and a protective layer including a resin layer arranged so as to cover the scintillator, wherein a region between the principal surface and an upper surface of the resin layer includes a first region, which is a region between adjacent columnar crystals of the plurality of columnar crystals, and a second region, which is a region where the resin layer is to be arranged and is between the upper surface and the plurality of columnar crystals and the first region, particles of a metal compound are arranged in the first region, and the particles of the metal compound are arranged in the second region at a concentration lower than that of the first region or the particles of the metal compound are not arranged in the second region, is provided.

According to still further embodiments, a method of manufacturing a radiation imaging panel, comprising: preparing a substrate which is a substrate formed by arranging a plurality of pixels each including a photoelectric conversion element on a principal surface, and in which a scintillator containing a plurality of columnar crystals is arranged on the principal surface; forming, so as to cover the scintillator, a first resin to which particles of a metal compound have been added; and forming a second resin on the first resin, wherein the particles of the metal compound are added to the second resin at a concentration lower than that of the first resin or the particles of the metal compound are not added to the second resin, is provided.

According to yet further embodiments, a scintillator plate comprising a substrate, a scintillator containing a plurality of columnar crystals arranged on a principal surface of the substrate, and a protective layer including a resin layer arranged so as to cover the scintillator, wherein a region between the principal surface and an upper surface of the resin layer includes a first region, which is a region between adjacent columnar crystals of the plurality of columnar crystals, and a second region, which is a region where the resin layer is to be arranged and is between the upper surface and the plurality of columnar crystals and the first region, particles of a metal compound are arranged in the first region, and the particles of the metal compound are arranged in the second region at a concentration lower than that of the first region or the particles of the metal compound are not arranged in the second region, is provided.

Further features of the present invention will become apparent from the following description of exemplary embodiments (with reference to the attached drawings).

BRIEF DESCRIPTION OF THE DRAWINGS

FIG. 1 is a sectional view showing an example of the arrangement of a radiation imaging panel according to an embodiment;

FIGS. 6A and 6B are tables showing characteristics of the radiation imaging panel of FIG. 1;

FIG. 8 is a graph showing characteristics of the radiation imaging panel of FIG. 7;

FIGS. 9A and 9B are tables showing characteristics of the radiation imaging panel of FIG. 7;

DESCRIPTION OF THE EMBODIMENTS

Figure 2:
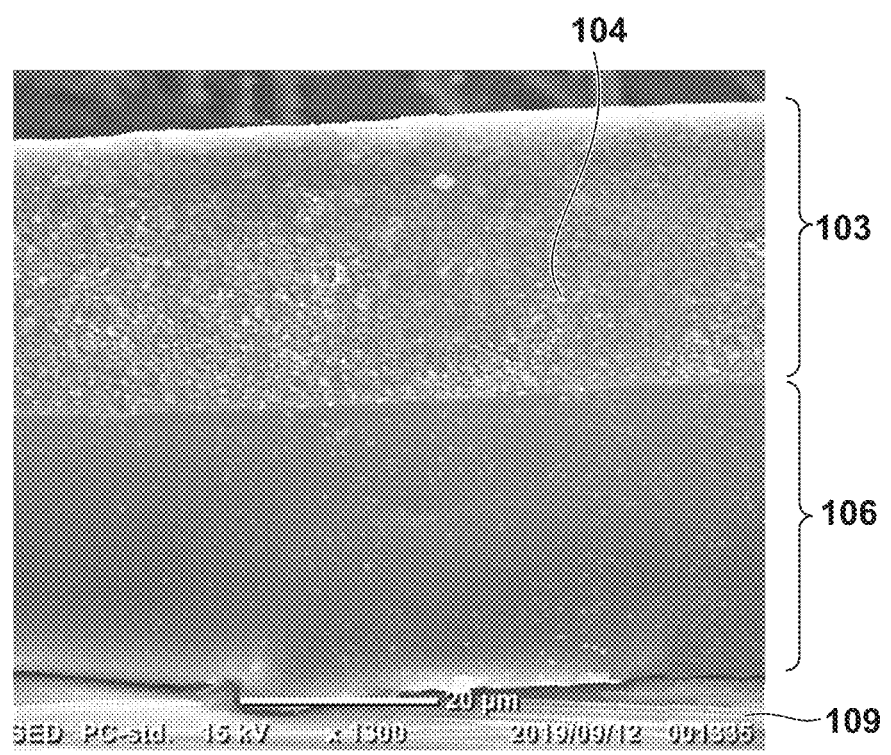
FIG. 2 is an SEM image of a section of a protective layer of the radiation imaging panel of FIG. 1.

An embodiment of the present invention will be described in detail below with reference to the accompanying drawings. Note that the following embodiment does not limit the invention according to the scope of the appended claims. Although a plurality of features are described in the embodiment, not all the features are essential to the invention and the plurality of features may arbitrarily be combined. The same reference numerals denote the same or similar parts and a repetitive description thereof will be omitted.

Radiation according to the present invention can include not only α-rays, β-rays, and γ-rays that are beams generated by particles (including photons) emitted by radioactive decay but also beams having equal or more energy, for example, X-rays, particle rays, and cosmic rays.

The arrangement of a radiation imaging panel according to an embodiment and a method of manufacturing the same will be explained below with reference to FIGS. 1 to 6. FIG. 1 is a view showing the sectional structure of a radiation imaging panel 100 according to this embodiment. The radiation imaging panel 100 includes a substrate 101 including a pixel region 105 in which a plurality of pixels each including a photoelectric conversion element are arranged, a scintillator 102 containing a plurality of columnar crystals 112 arranged on the substrate 101, and a protective layer 108. The protective layer 108 includes a first resin layer 103 arranged so as to cover the scintillator 102 and a second resin layer 106 arranged on the first resin layer 103. A pixel protecting layer 107 for protecting the pixels arranged in the pixel region 105 may be provided between the substrate 101 and the scintillator 102.

In the pixel region 105, a plurality of pixels can be arranged in the form of a two-dimensional array. For example, 3,300×2,800 pixels can be arranged on a 550-mm× 445-mm substrate 101. Of the 3,300×2,800 pixels, it is possible to use 10 pixels arranged on the outer circumference as a dummy pixel region, and form an effective pixel region of the pixel region 105 by using 3,280×2,780 pixels arranged inside the dummy pixels. It is possible to appropriately set the number of pixels to be arranged in the pixel region 105, and the number of pixels to be arranged in the effective pixel region of the pixel region 105, in accordance with, for example, the size of the substrate 101 and an object to be imaged.

In the pixel region 105, it is possible to form column signal lines for extracting signals generated in the individual pixels, and row signal lines for driving the individual elements including these pixels arranged in the pixel region 105. The column signal lines and the row signal lines can electrically be connected to a readout circuit substrate and a driving circuit substrate via a flexible circuit board. The substrate 101 can have a connecting terminal portion (not shown) in order to connect the column signal lines and the row signal lines to the readout circuit substrate and the driving circuit substrate. Signals generated in the individual pixels of the pixel region 105 can be output from the radiation imaging panel 100 via the connecting terminal portion.

In this example, the readout circuit and the driving circuit are arranged outside the radiation imaging panel 100. However, the readout circuit and the driving circuit may also be arranged in the radiation imaging panel 100. Even in this case, the connecting terminal portion (not shown) can be formed on the substrate 101, and signals generated in the individual pixels of the pixel region 105 can be output from the radiation imaging panel 100 via the connecting terminal portion (not shown).

In this embodiment, the protective layer 108 further includes a base 110 arranged on the second resin layer 106 and a metal layer 109 arranged between the second resin layer 106 and the base 110. However, the arrangement of the protective layer 108 is not limited to this. For example, the protective layer 108 may have a two-layer structure formed by the first resin layer 103 and the second resin layer 106. Alternatively, for example, the protective layer 108 may have a three-layer structure in which the base 110 is arranged on the second resin layer 106. Furthermore, the protective layer 108 may have, for example, a structure formed by five or more layers.

The scintillator 102 converts radiation that enters the scintillator 102 into light detectable by the photoelectric conversion elements arranged in the pixel region 105 of the substrate 101. For example, the scintillator 102 can convert the radiation into visible light. An alkali metal halide such as cesium iodide (CsI) or the like that can grow the columnar crystals 112 can be used as the scintillator 102. If CsI is used as the scintillator 102, thallium iodide (TlI) can be used as an activator.

The scintillator 102 can be formed by, for example, vapor deposition. The substrate 101 can be placed in a vapor deposition apparatus so that the surface, of the substrate 101, on the side on which the pixel region 105 is formed will be the vapor deposition surface, and codeposition will be performed by filling cell vessels with CsI and TlI such that the Tl concentration is 1 mol % with respect to CsI, and heating the materials. The scintillator 102 containing the plurality of columnar crystals 112 will be formed as a result.

The protective layer 108 is formed on the scintillator 102. The scintillator 102 that is formed by the plurality of columnar crystals 112 containing alkali metal halide will deteriorate due to moisture absorption. Hence, the protective layer 108 functions as a moisture preventing layer of the scintillator 102. By making the protective layer 108 that covers the scintillator 102 have the function of a moisture preventing layer, it will be possible to prevent the scintillator 102 from deteriorating due to moisture.

The first resin layer 103 of the protective layer 108 will be described next. The first resin layer 103 of the protective layer 108 contains a resin to which metal compound particles 104 have been added. By arranging the metal compound particles 104 in the first resin layer 103, rays of light, among the rays of light generated by the scintillator 102, which enter the side of the first resin layer 103 will be reflected in a short optical path length and can be made to reenter the columnar crystals 112 of the scintillator 102 from which they were emitted. As a result, it will be possible to suppress the diffusion of light that enters the side of the first resin layer 103, and the radiation imaging panel 100 in which MTF (Modulation Transfer Function) degradation has been suppressed can be provided.

The second resin layer 106 of the protective layer 108 can be a layer which has a lower light reflectance than the first resin layer 103. That is, letting r1 [%] be a light reflectance of the first resin layer and r2 [%] be a light reflectance of the second resin layer, it can satisfy r1>r2. Here, the light reflectance r1 of the first resin layer 103 is the ratio of the rays of light, among the rays of light that propagate from the scintillator 102 to the first resin layer 103, which will reenter into the side of the scintillator 102 from the side of the first resin layer 103. That is, the light reflectance r1 of the first resin layer 103 includes components of reflection that occurs when light propagated from the scintillator 102 to the first resin layer 103 is reflected by the interface of the first resin layer 103 and components of reflection that occurs when light which entered the first resin layer 103 is reflected by metal compound particles 104 or the like in first resin layer 103. In a similar manner, the light reflectance r2 of the second resin layer 106 is the ratio of the rays of light that will reenter into the side of the first resin layer 103 from the side of the second resin layer 106 among the rays of light propagated from the first resin layer 103 to the second resin layer 106.

In addition, the second resin layer 106 is a layer which has a higher light absorptance than the light reflectance r2 [%] of the second resin layer 106. That is, it satisfies a state in which r2<a2, where a2 [%] is a light absorptance of the second resin layer 106. The light absorptance a2 of the second resin layer 106 will be described here. The following relation is established between an absorptance a [%], a reflectance r [%], and a transmittance t [%] of light from an incident direction of the light.

$$100[\%] = a[\%] + r[\%] + t[\%] \quad (1)$$

Hence, for example, by measuring a light transmittance t2 of the second resin layer 106 in addition to the light reflectance r2 of the second resin layer 106, the light absorptance a2 of the second resin layer 106 can be obtained based on the relation of equation (1).

The second resin layer 106 which is arranged on the first resin layer 103 is a layer whose light absorptance a2 is higher than the light reflectance r2. Based on this relation, the rays of light, among the rays of light emitted from the scintillator 102, which entered the first resin layer 103 and further entered second resin layer 106 after passing through the first resin layer 103 will be absorbed to a certain degree. This can suppress the diffusion of light that entered the second resin layer 106. As a result, the MTF of the radiation imaging panel 100 can be further improved.

In a case in which the light reflectance r1 of the first resin layer 103 is high and the light that entered the first resin layer 103 will be repetitively reflected in the first resin layer 103 but will not enter the second resin layer 106, the radiation imaging panel 100 may not be able to obtain a high MTF value. This is because the light that entered the first resin layer 103 will be reflected and scattered repeatedly in the first resin layer 103, and light components that will diffuse in a horizontal direction will increase. The horizontal direction is a direction that intersects with a thickness direction, of the first resin layer 103, between the scintillator 102 and the second resin layer 106. Also, in a case in which the light reflectance of the first resin layer 103 is low, the probability of making the above-described light that entered the first resin layer 103 to reenter the columnar crystals 112 of the scintillator 102 which emitted the light will decrease. That is, the light reflectance of the first resin layer 103 needs to fall within an appropriate range. The range of the light reflectance of the first resin layer 103 will be described later with reference to an example.

Example of Radiation Imaging Panel 100

A manufacturing method and an MTF improvement effect of the radiation imaging panel 100 will be described next with reference to an example. First, 550-mm×445-mm non-alkali glass having a thickness of 500 µm was prepared as the substrate 101. The substrate 101 is not limited to glass, and for example, a resin substrate or a semiconductor substrate such as silicon or the like may be used. Next, the pixel region 105 was formed by repetitively performing a deposition step of depositing a semiconductor layer such as silicon (for example, amorphous silicon) and a metal (for example, aluminum) for forming a wiring layer and the like, a photolithography step, an etching step, and the like on the glass substrate 101. A plurality of pixels, each including a light converting element for generating electric charge corresponding to the light emission of the scintillator 102 and a switching element for outputting a signal corresponding to the generated electric charge, are arranged in the pixel region 105. In addition, a connection terminal portion (not shown) for driving the pixels and for transmitting the obtained signals to an external circuit is formed in the pixel region 105.

After the pixel region 105 was formed, an array inspection for checking the operations of the pixels formed in the pixel region 105 was performed. In the array inspection, the fact that the photoelectric conversion elements and the switching elements formed in the pixel region 105 are operating well and the fact that there is no defective pixel or there are only a few defective pixels were confirmed. After the execution of the array inspection, the pixel protecting layer 107 was formed for the purpose of protecting the connection terminal portion (not shown), by masking the periphery of the substrate 101 with a masking film. More specifically, the pixel protecting layer 107 was formed by placing the substrate 101 in a spray spin coater, spinning the substrate 101 at a rotational speed of approximately 100 rpm while spraying a polyimide solution, and subsequently drying and annealing the substrate 101 at a temperature of 220° C. In this example, the pixel protecting layer 107 having a thickness of, for example, approximately 2 µm was formed.

After preparing the substrate 101 in which the pixel region 105 was formed, the scintillator 102 was formed next. First, a vapor deposition mask was set on a region, where no scintillator 102 is to be formed, of the substrate 101 on which the pixel protecting layer 107 was formed, and the substrate 101 was placed in a vapor deposition apparatus so that the side of the substrate 101 on which the pixel protecting layer 107 was arranged will be a vapor deposition surface. Codeposition was performed thereafter by filling cell vessels with CsI and Tl so that the Tl concentration will be 1 mol % with respect to CsI, and heating the filled cell vessels. When the vapor deposition of the scintillator 102 was to be performed, the vapor deposition apparatus was evacuated to $10^{-3}$ Pa, and heating was subsequently performed by using a lamp heater so that the temperature of the surface of the substrate 101 would become 175° C. In this example, the scintillator 102 had a thickness of 380 µm and a film filling rate of 75%. At this time, the outer edges of the scintillator 102 can be arranged closer to the outer side than the outer edges of the pixel region 105.

A method of forming the first resin layer 103, of the protective layer 108, which is arranged so as to cover the scintillator 102 and to which the metal compound particles 104 have been added will be described next. In this example, a hot melt resin mainly containing a polyolefin resin was used as the resin for forming the first resin layer 103. The hot melt resin is defined as an adhesive resin that contains neither water nor a solvent, is a solid at room temperature, and is made of a 100%-nonvolatile thermoplastic material (Thomas P. Flanagan, Adhesives Age, vol. 9, No. 3, pp. 28 (1966)). Also, the hot melt resin has a property of melting when the resin temperature rises and solidifying when the resin temperature lowers. The hot melt resin is a resin that is adhesive to another organic material and an inorganic material in a heated molten state, and is not adhesive in a solid state at room temperature. In addition, the hot melt resin neither contains a polar solvating medium, a solvent, nor water. Hence, even if the hot melt resin comes in contact with the scintillator 102 which contains the alkali halide columnar crystals 112, the possibility that the hot melt resin will dissolve the scintillator 102 will be low. Therefore, the first resin layer 103 that uses the hot melt resin can also have the function of a moisture preventing layer (protective layer) with respect to the scintillator 102.

The hot melt resin is classified in accordance with the type of a base polymer (base material) as a main component. It is possible to use polyolefin-based, polyester-based, and polyamide-based resins as the base polymer for forming the first resin layer 103. When using the hot melt resin as the protective layer 108 (the first resin layer 103) of the scintillator 102, it is important for the resin to have a high moisture proofness and a high light transparency for transmitting visible light generated from the scintillator 102.

The material for forming the first resin layer 103 is not limited to the hot melt resin. For example, a resin having pressure-sensitive adhesiveness obtained by an intermolecular force, that is, a resin that is a so-called adhesive may be used as the resin for forming the first resin layer 103. In this case, a urethane resin, an acrylic resin, or the like can be used as the resin for forming the first resin layer 103. For example, as an acrylic resin, a polymethyl methacrylate resin (PMMA) may be used as the first resin layer 103.

In this example, the first resin layer 103 was formed by dissolving a polyolefin resin in a toluene-xylene solvent mixture, and the viscosity was further adjusted to be about 10 cps. In addition, the metal compound particles 104 were dispersed together with a dispersant in a solution mixture of butanol and propanol in advance. Thereafter, a material obtained by dissolving a resin such as a polyolefin resin in the toluene-xylene solution mixture was added to this, and the resultant mixture was sufficiently crushed by using a ball mill. This resultant dispersion was mixed, stirred, and passed through a three roll mill to obtain a resin solution in which the metal compound particles 104 have dispersed without any clumps.

Next, a PET film roll having a thickness of 30 µm and a releasing action was set to a roll coater apparatus. This PET film was coated with the resin solution to be the first resin layer 103 that was adjusted in the above-described manner, and the coated PET film was dried to form the first resin layer 103. It is possible to obtain, in this manner, a thermoplastic resin film to be used as the first resin layer 103 which has an appropriate thickness and in which the metal compound particles 104 have been dispersed.

The metal compound particles 104 may be metal oxide particles. A material having a refractive index higher than that of the scintillator 102 can be used as the metal compound particles 104. For example, when above-described CsI (refractive index (n): 1.78 to 1.84 (depending on the type of activator or the like)) is used as the scintillator 102 of an alkali metal halide, a material having a refractive index higher than that of CsI can be used. For example, white lead (2PbCo$_3$.Pb(OH)$_2$) (n: 1.94 to 2.09), zinc oxide (n: 2.0), yttrium oxide (n: 1.91), zirconium oxide (n: 2.20), titanium oxide (n: 2.50 to 2.72), or the like can be used as the metal compound particles 104. For example, the refractive index of the metal compound particles 104 can be 1.94 or more and 2.72 or less. In this example, rutile-type titanium dioxide particles (n: 2.72) that have a refractive index higher than those of other titanium oxides were used as the metal compound. However, the present invention is not limited to this, and various kinds of materials with a high reflection property can be used as the metal compound particles 104. For example, a material such as barium sulfate, magnesium oxide, or the like may be used as the metal compound particles 104.

The refractive index of each metal compound particle 104 may be higher than that of the resin forming the first resin layer 103. By increasing the difference between the refractive index of each metal compound particle 104 and the refractive index of the first resin layer 103, light can be reflected more easily by the surfaces of the metal compound particles 104 in the first resin layer 103. The refractive index of the above-described hot melt resin is about 1.52, the refractive index of a urethane resin is about 1.49, and the refractive index of an acrylic resin is about 1.49 to 1.53.

Also, the average particle size of the metal compound particles 104 to be added to the first resin layer 103 can be 200 nm or more and 500 nm or less. The sensitivity characteristic of a photoelectric conversion element is generally 500 nm to 800 nm, but the effect of Rayleigh scattering will appear if the size of the particles is ½ or less than the wavelength of light. Hence, if the average particle size of the metal compound particles 104 is approximately 200 nm or more and 500 nm or less, the probability that the light which enters each particle 104 will be reflected to the side of the incident direction of light will increase.

A measurement method of the light reflectance r1 of the first resin layer 103 according to this example will be described next. The light reflectance r1 of the first resin layer 103 was measured in accordance with the following method by using the V-750 UV-visible spectrophotometer manufactured by JASCO.

First, the first resin layer 103 was adhered to a white reference plate of the spectrophotometer. At this time, the PET film having the releasing action and used when the first resin layer 103 was formed was peeled off. Next, the first resin layer 103 was heated to a melting temperature and cooled, and then subsequently set in a reflectance measurement adapter of the spectrophotometer. After the first resin layer 103 was set to the reflectance measurement adapter of the spectrophotometer, a reflectance spectrum of the first resin layer 103 was obtained by performing scanning between wavelengths of 380 nm to 780 nm at a wavelength resolution of 0.1 nm and performing correction by using values obtained from measuring the white reference plate under the same condition. The reflectance spectrum values obtained by this measurement was integrated and averaged at a wavelength range of 550 nm to 780 nm in consideration of a spectral sensitivity region of the light emission wavelength region of the scintillator 102 and the photoelectric conversion elements of the pixel region 105. As a result, the light reflectance r1 of the first resin layer 103 was obtained as a reflectance obtained as a result of integrating and averaging the wavelengths.

Here, as described above, the light reflectance r1 of the first resin layer 103 includes components obtained from interface reflection of light which is to enter the first resin layer 103 and components obtained when light which entered the first resin layer 103 is reflected by metal compound particles 104 or the like in first resin layer. This light reflectance r1 of the first resin layer 103 can be changed to an appropriate value based on the concentration of the metal compound particles 104 dispersed in the first resin layer 103 and the thickness of the first resin layer 103.

A method of forming the second resin layer 106 will be described next. In this example, the second resin layer 106 was formed by forming a resin layer to be the second resin layer 106 on the base 110 as a 30-μm PET film to which aluminum has been deposited as the metal layer 109 at a thickness of 12 μm. That is, the metal layer 109 is arranged between the second resin layer 106 and the base 110. A material similar to that of the first resin layer 103, such as the above-described hot melt resin, a urethane resin, an acrylic resin, or the like can be used as the resin for forming the second resin layer 106. The first resin layer 103 and the second resin layer 106 may contain resins that have the same chemical composition. In other words, the first resin layer 103 and the second resin layer 106 may be made of the same resin. In this example, in a similar manner to the first resin layer 103, the hot melt resin mainly containing a polyolefin resin was used as the resin for forming the second resin layer 106.

Although the metal compound particles 104 were added to the first resin layer 103, carbon black particles were added to the second resin layer 106 in this example. It will be possible to change the light absorptance a2 and the light reflectance r2 of the second resin layer 106 to appropriate values by changing the concentration of the carbon black particles dispersed in the second resin layer 106. Carbon black is a typical low-cost black material, and can be dispersed in the second resin layer 106 at an appropriate concentration. However, the material to be added to the second resin layer 106 is not limited to carbon black. The material suffices to be a material which will allow the light absorptance a2 of the second resin layer 106 to be greater than the light reflectance r2 of the second resin layer 106. For example, a metal oxide-based black pigment such as iron, titanium, or the like may be added to the second resin layer 106.

A measurement method of the light reflectance r2 and the light absorptance a2 of the second resin layer 106 will be described. The light reflectance r2 of the second resin layer 106 was measured by using a method similar to that of the light reflectance r1 of the first resin layer 103 described above.

The light absorptance a2 of the second resin layer 106 was obtained by using the relation of equation (1) described above and measuring a light transmittance t2 in addition to the light reflectance r2. The light transmittance t2 of the second resin layer 106 can be measured by the following method. First, the second resin layer 106 was formed on a PET film having a releasing action, and the second resin layer 106 was attached to a frame-like cell. At this time, the PET film used during the formation of the second resin layer 106 was peeled off. Next, the second resin layer 106 is heated to a melting temperature and cooled. After being cooled, the second resin layer 106 was set in the spectrophotometer so that the light from the light source of the above-described spectrophotometer would pass through a hollow portion of the frame-like cell to which the second resin layer 106 was attached, that is, pass through the second resin layer 106 attached to the cell and would enter the light transmitting side of the spectrophotometer. After the second resin layer 106 was set to an appropriate position in the spectrophotometer, the transmittance spectrum of the second resin layer 106 was obtained by performing scanning between wavelengths of 380 nm to 780 nm at a wavelength resolution of 0.1 nm and performing correction by based on a reference measurement value using air. The light transmittance t2 of the second resin layer 106 was obtained as an integral average of light transmittance by integrating and averaging the transmittance spectrum values obtained by this measurement at a wavelength range of 550 nm to 780 nm. Subsequently, equation (1) was used to obtain the light absorptance a2 of the second resin layer 106 based on the light reflectance r2 and the light transmittance t2 of the second resin layer 106 obtained in this manner.

In this example, the first resin layer 103 and the second resin layer 106 were stacked in accordance with the following processes. The first resin layer 103 formed according to the above-described method was overlayed on the second resin layer 106, which was formed on the base 110 made of a PET film, and set in a vacuum thermal transfer apparatus. The second resin layer 106 was formed, as described above, on the metal layer 109 which was formed by depositing aluminum onto the base 110. Next, the first resin layer 103 and the second resin layer 106 were heated at a temperature of 50° C., which is the temperature near the glass transition point of the hot melt resin mainly containing a polyolefin resin, so as to adhere and stack the first resin layer 103 and the second resin layer 106. FIG. 2 is an example of a sectional SEM image of the protective layer 108 in which the second resin layer 106 and the first resin layer 103 have been stacked. It could be confirmed from the sectional SEM image shown in FIG. 2 that the first resin layer 103 and the second resin layer 106 were stacked in a sufficiently adhered state. In addition, the metal compound particles 104 added to the first resin layer 103 could also be confirmed from the sectional SEM image shown in FIG. 2.

After the protective layer 108 in which the first resin layer 103 and the second resin layer 106 were stacked was formed, the radiation imaging panel 100 shown in FIG. 1 was manufactured by using a vacuum thermal transfer apparatus or the like to adhere the protective layer 108 to the substrate 101 on which the scintillator 102 was formed. The substrate 101 and the protective layer 108 were set in the vacuum thermal transfer apparatus so that the first resin layer 103 of the protective layer 108 would face the scintillator 102 of the substrate 101, on which the scintillator 102 was formed. After aligning the substrate 101 and the protective layer 108 by using alignment marks, the scintillator 102 and the first resin layer 103 were brought into contact with each other at a temperature of 30° C. Next, air bubbles were removed by lowering the pressure in the vacuum thermal transfer apparatus to $10^{-1}$ Pa. Furthermore, the temperature was increased to 70° C. to 100° C. while a pressure was applied between the substrate 101 and the protective layer 108, and the substrate 101 on which the scintillator 102 was formed and the first resin layer 103 which forms the protective layer 108 were adhered to each other by maintaining this pressure applied state for an appropriate time.

Subsequently, a driving substrate or the like was connected, via an anisotropic conductive film, to the connecting terminal portion (not shown) of the substrate 101 to which the protective layer 108 including the first resin layer 103 and the second resin layer 106 were adhered. Furthermore, a sheet for increasing the strength of the radiation imaging panel 100 was adhered on the side, of the substrate 101, opposite to the scintillator 102. The radiation imaging panel 100 according to this example was manufactured based on the above-described processes.

An MTF improvement effect according to this embodiment will be described next. The radiation imaging panel 100 was manufactured by using the manufacturing method as described above. As described above, a polyolefin-based hot melt resin was used for the first resin layer 103. Rutile-type titanium dioxide particles having an average particle size of 250 nm and a particle size distribution in which 10% diameter $D_{10}$=195 nm, 50% diameter (median diameter) $D_{50}$=245 nm, and 90% diameter $D_{90}$=275 nm were used as the metal compound particles 104 to be added to the first resin layer 103. By appropriately adjusting the concentration of the metal compound particles 104 dispersed in the first resin layer 103 and the thickness of the first resin layer 103, the first resin layers 103 with five kinds of light reflectances r1 of 37.6%, 48.9%, 60.3%, 74.6%, and 90.7% were obtained. The light reflectances r1 of the first resin layers 103 were measured here by using the method described above. For example, the thickness of the first resin layer 103 can be about 30 μm.

In a similar manner to the first resin layer 103, a polyolefin-based hot melt resin was used for the second resin layer 106. By appropriately adjusting the concentration of the carbon black particles to be added to the second resin layer 106, the second resin layers 106 with six kinds of light absorptances a2 of 14.6%, 30.0%, 50.0%, 70.0%, 94.6%, and 97.6% were obtained. For example, the thickness of the second resin layer 106 can be about 30 μm. Also, the light reflectances r2 of the second resin layers 106 were 14.5%, 12.7%, 10.2%, 7.7%, 5.4%, and 2.4%, respectively, in the order of the above-described light absorptances a2. That is, the second resin layer 106 satisfies r2<a2. The light reflectances r2 and the light absorptances a2 of the second resin layer 106 were measured here by using the method described above.

Thirty kinds of radiation imaging panels 100 according to this example were manufactured by combining the five kinds of first resin layers 103 and the six kinds of second resin layers 106. The light reflectance r1 of the first resin layer 103 and the light reflectance r2 of second resin layer 106 satisfy r1>r2 in these 30 kinds of radiation panels 100.

As a comparative example, a radiation imaging panel that includes, on the metal layer 109 of the base 110 made of a 30-μm PET film and on which the metal layer 109 made by depositing aluminum at a thickness of 12 μm has been formed, a protective layer formed by coating the metal layer 109 with a polyolefin-based hot melt resin was formed. Neither metal compound particles 104 nor carbon black particles have been added to the hot melt resin of the protective layer of the comparative example. The light reflectance r1 of the hot melt resin of the protective layer of the radiation imaging panel of the comparative example that corresponds to the first resin layer 103 of the example was 4.1%. In addition, the light absorptance a2 and the light reflectance r2 of the base 110, on which the metal layer 109 of the protective layer of the radiation imaging panel of the comparative example is formed and which corresponds to the second resin layer 106 of the example, were 14.6% and 85.4%, respectively. Since the surface of the base 110 on which the metal layer 109 is a metal, r2<a2 is not satisfied.

Figure 3A:
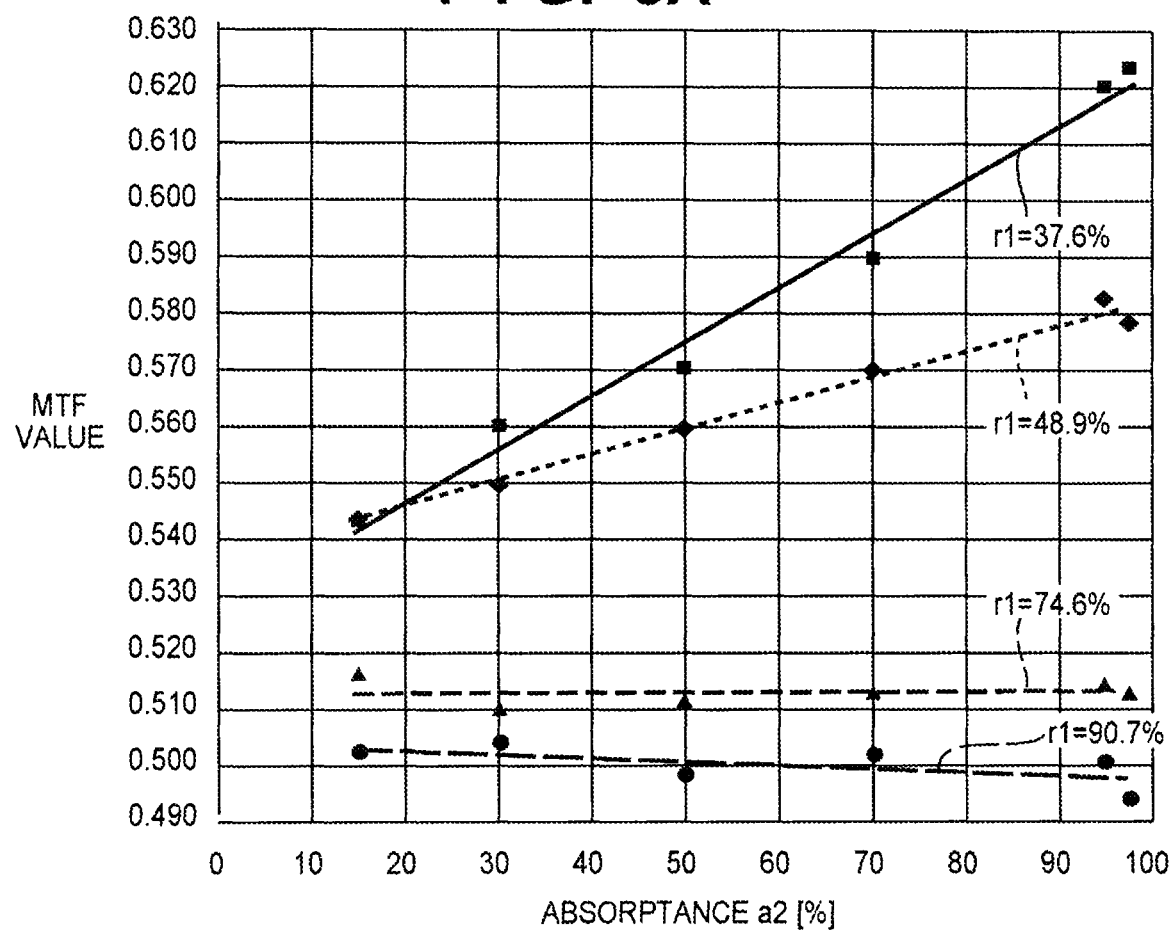
FIGS. 3A and 3B are graphs each showing a relationship between a light reflectance and a light absorptance of the protective layer and an MTF of the radiation imaging panel of FIG. 1.

FIG. 3A is a graph showing the relationship between the MTF of the radiation imaging panel 100, the light reflectance r1 of the first resin layer 103, and the light absorptance a2 of the second resin layer 106. FIG. 3A shows the MTF value of the radiation imaging panel 100 in a case in which the light reflectance r1 of the first resin layer 103 is at 37.6%, 48.9%, 74.6%, or 90.7%. The MTF values shown in FIG. 3A are MTF values obtained when measurement was performed by irradiating the radiation imaging panel 100 with an X-ray at 2 lp/mm in compliance with radiation quality RQAS of the international standards. In addition, FIG. 3B is a graph plotting the tilt of each line shown in FIG. 3A corresponding to the light reflectance r1 of each first resin layer 103.

Figure 3B:
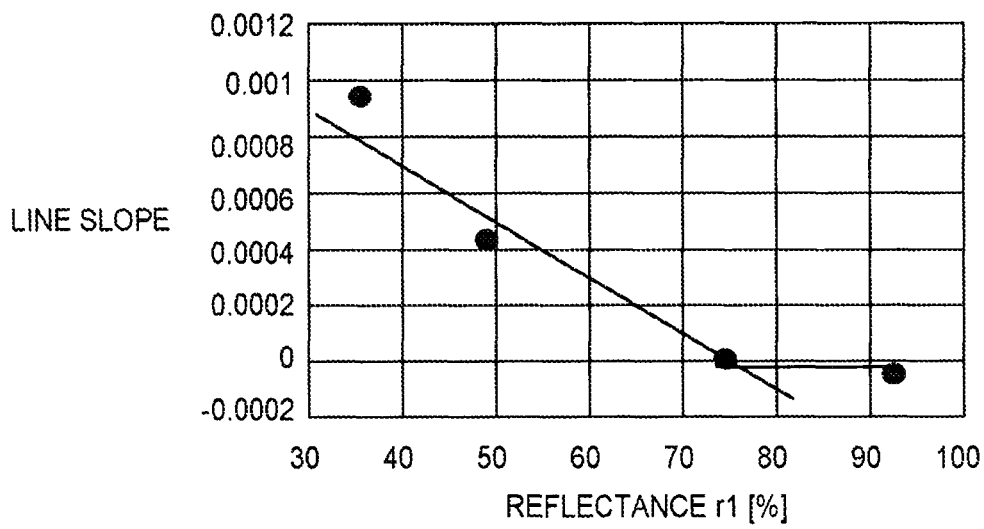

Based on FIGS. 3A and 3B, it can be seen that, in a case in which the light reflectance r1 of the first resin layer 103 is 75% or more (r1≥75%), the MTF value will be a constant value regardless of the light absorptance a2 of the second resin layer 106. This indicates that when the reflectance of the first resin layer 103 is 75% or more, a large portion of the light that entered the first resin layer 103 will not enter the second resin layer 106 but will be repetitively reflected and scattered in the first resin layer 103. That is, since the light reflectance r1 of the first resin layer 103 is too high, the light that entered the first resin layer 103 will repetitively be reflected and scattered in the first resin layer 103 and will diffuse in the horizontal direction. Hence, it can be considered to be a region where the MTF will not improve. Therefore, this indicates that the light reflectance r1 of the first resin layer 103 needs to be less than 75%.

Figure 4:
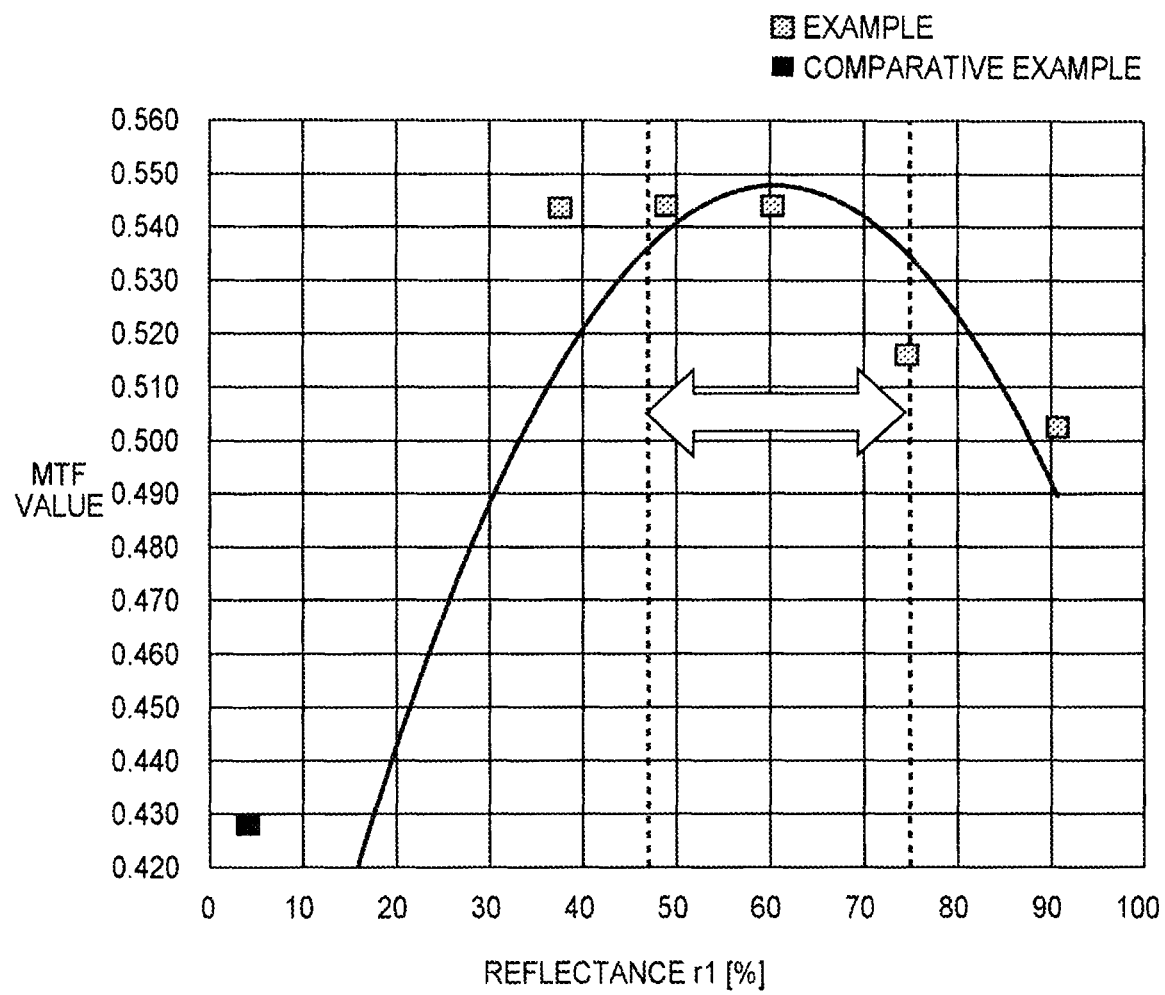
FIG. 4 is a graph showing a relationship between the light reflectance and the light absorptance of the protective layer and the MTF of the radiation imaging panel of FIG. 1.

FIG. 4 shows the relationship between the light reflectance r1 of the first resin layer 103 and the MTF value in a case in which the light absorptance a2 of the second resin layer 106 is 14.6%. In addition, FIG. 4 also shows the light reflectance and the MTF value of a hot melt resin, which corresponds to the first resin layer 103 of the example, of the radiation imaging panel according to the comparative example. It can be seen from FIG. 4 that when the light reflectance r1 of the first resin layer 103 is 47% or more, a high MTF value which is equal to or more than that when the light reflectance r1 of the first resin layer 103 is 75% will be obtained. Hence, in a case in which the light reflectance r1 [%] of the first resin layer 103 is 47%<r1<75%, the MTF of the radiation imaging panel 100 can be improved.

Also, in a case in which the light reflectance r1 [%] of the first resin layer 103 is 47%<r1<75%, it can be seen from FIG. 3A that the MTF value can be improved if the light absorptance a2 of the second resin layer 106 is 20% or more. Furthermore, the MTF value can be further improved if the light absorptance a2 of the second resin layer 106 is 50% or more. In this manner, it can be seen that a high MTF value can be obtained in the radiation imaging panel 100.

Figure 5:
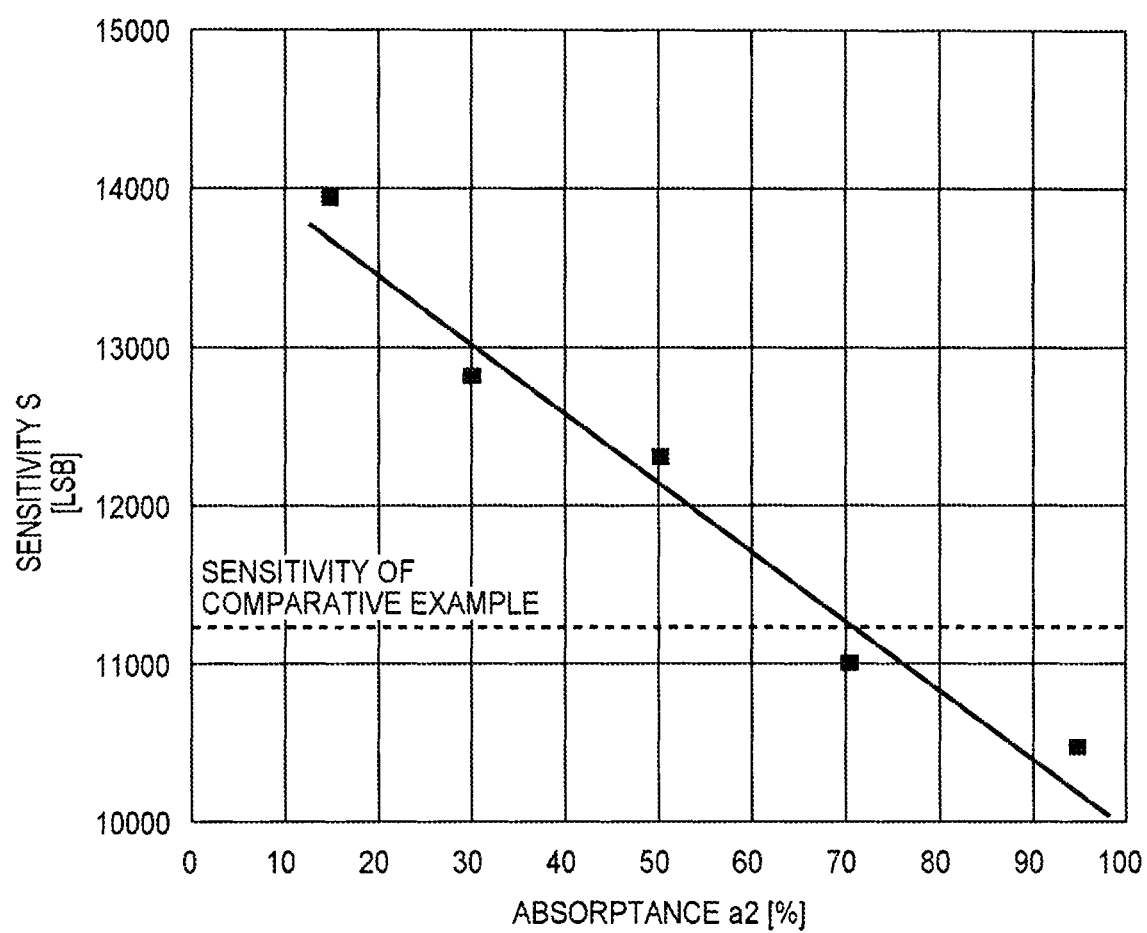
FIG. 5 is a graph showing a relationship between the light absorptance and the sensitivity of the protective layer of the radiation imaging panel of FIG. 1.

FIG. 5 is a graph showing the relationship between the light absorptance a2 of the second resin layer 106 and a sensitivity S in a case in which the light reflectance r1 of the first resin layer 103 is 48.9%. The dotted line in FIG. 5 indicates the sensitivity of the radiation imaging panel according to the comparative example. It can be seen from FIG. 5 that the sensitivity of the radiation imaging panel 100 will become lower than that of the radiation imaging panel according to the comparative example if the light absorptance a2 of the second resin layer 106 exceeds 72%. This is considered to be due to the fact that the light which passed through the first resin layer 103 and entered the second resin layer 106 has attenuated in the second resin layer 106, and the light which reenters the first resin layer 103 has decreased. Hence, the light absorptance a2 of the second resin layer 106 can be less than 72%. That is, if the lower limit value of the light absorptance a2 of the second resin layer 106 described above is included, the light absorptance a2 [%] of the second resin layer 106 may satisfy 20%<a2<72%. In addition, the light absorptance a2 [%] of the second resin layer 106 may satisfy 50%<a2<72%.

FIGS. 6A and 6B are tables summarizing each of the above-described characteristics of the radiation imaging panels 100 that have been manufactured by combining the first resin layers 103 with five kinds of light reflectances r1 and the second resin layers 106 with six kinds of light absorptances a2. When the light reflectance r1 [%] of the first resin layer 103 satisfies 47%<r1<75% and the light reflectance r2 [%] and the light absorptance a2 [%] of the second resin layer 106 satisfies r1<r2, the MTF of the manufactured radiation imaging panel 100 will improve in the above described manner. Also, at this time, the light reflectance r1 [%] of the first resin layer 103 and the light reflectance r2 [%] of the second resin layer 106 may satisfy the relation r1>r2. Furthermore, the light absorptance a2 [%] of the second resin layer 106 may satisfy 20%<a2<72%. In addition, the light absorptance a2 [%] of the second resin layer 106 may satisfy 50%<a2<72%. As a result, it will be possible to suppress sensitivity degradation while also improving the MTF of the radiation imaging panel 100.

A refractive index n1 of the first resin layer 103 and a refractive index n2 of the second resin layer 106 can satisfy n1≥n2. In a case in which the refractive index n1 of the first resin layer 103 is greater than the refractive index n2 of the second resin layer 106, it will suppress the light that passed through the first resin layer 103 and entered the second resin layer 106 from reentering the first resin layer 103. This can improve the MTF in a manner similar to when the light absorptance a2 of the second resin layer 106 is increased. Since the same hot melt resin was used for the first resin layer 103 and the second resin layer 106 in the example described above, the relation of the refractive index n1 of the first resin layer 103 and the refractive index n2 of the second resin layer 106 was n1=n2.

In addition, for example, the light reflectance r1 [%] of the first resin layer 103 may be higher than a light absorptance a1 [%] of the first resin layer 103 (r1>a1). Also, for example, the light absorptance a1 of the first resin layer 103 may be lower than the light absorptance a2 of the second resin layer 106 (a1<a2). That is, the first resin layer 103, of the protective layer 108, which is closer to the scintillator 102 than the second resin layer 106 may be a layer that reflects the light more than the second resin layer 106, and may be a layer that does not absorb light more than the second resin layer 106.

A modification of the radiation imaging panel 100 will be described next. In the arrangement disclosed in Japanese Patent Laid-Open No. 2006-052980, some of the rays of light that entered the phosphor protecting layer from the columnar crystals may reach the upper surface of the phosphor protecting layer and be diffused upon being reflected by the upper surface of the phosphor protecting layer to the side of the scintillator. The MTF (Modulation Transfer Function) may degrade if the light disperses in the phosphor protecting layer.

Figure 7:
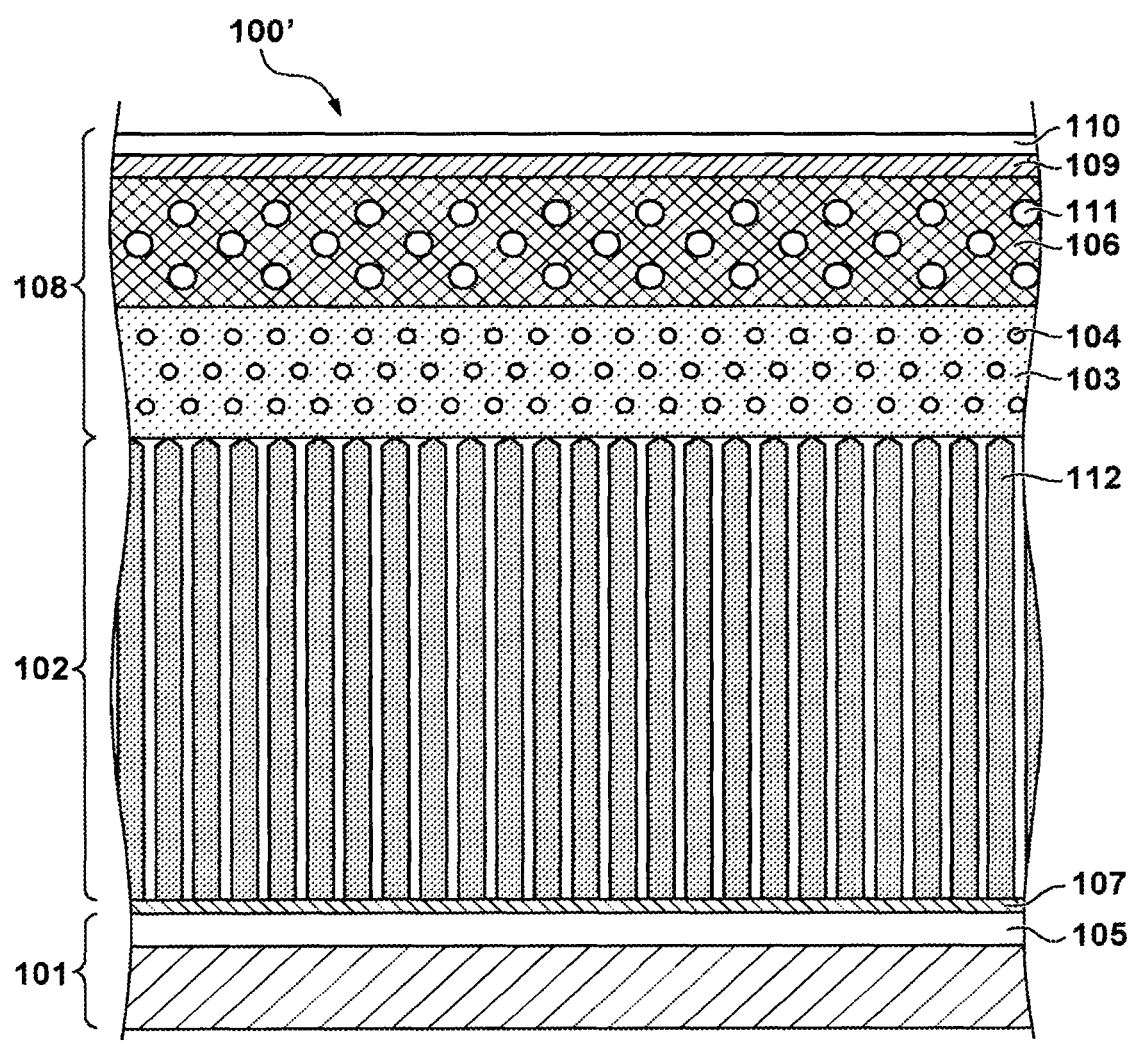
FIG. 7 is a sectional view showing a modification of the radiation imaging panel of FIG. 1.

An arrangement and a method of manufacturing a radiation imaging panel according to this embodiment which is a modification of the radiation imaging panel 100 will be described with reference to FIGS. 7 to 9. FIG. 7 is a view showing a modification of the sectional structure of the radiation imaging panel 100 shown in FIG. 1. A radiation imaging panel 100' according to this embodiment includes the substrate 101 including the pixel region 105 in which a plurality of pixels each including a photoelectric conversion element are arranged, a scintillator 102 containing the plurality of columnar crystals 112 arranged on the substrate 101, and the protective layer 108. The protective layer 108 includes the first resin layer 103 arranged so as to cover the scintillator 102 and the second resin layer 106 arranged on the first resin layer 103. In other words, the protective layer 108 includes the second resin layer 106 and the first resin layer 103 which is arranged between the second resin layer 106 and the scintillator 102. The pixel protecting layer 107 for protecting the pixels arranged in the pixel region 105 may be arranged between the substrate 101 and the scintillator 102 as shown in FIG. 7.

A plurality of pixels can be two-dimensionally arrayed in the pixel region 105. For example, 3,300×2,800 pixels can be arranged on the 550-mm×445-mm substrate 101. Of the 3,300×2,800 pixels, it is possible to use 10 pixels arranged on the outer circumference as a dummy pixel region, and form an effective pixel region of the pixel region 105 by using 3,280×2,780 pixels arranged inside the dummy pixels. It is possible to appropriately set the number of pixels to be arranged in the pixel region 105, and the number of pixels to be arranged in the effective pixel region of the pixel region 105, in accordance with, for example, the size of the substrate 101 and an object to be imaged.

Column signal lines for extracting signals generated in the individual pixels, and row signal lines for driving the individual elements including these pixels arranged in the pixel region 105 can be arranged in the pixel region 105. The column signal lines and the row signal lines can electrically be connected to a readout circuit substrate and a driving circuit substrate via a flexible circuit board. The substrate 101 can have a connecting terminal portion (not shown) in order to connect the column signal lines and the row signal lines to the readout circuit substrate and the driving circuit substrate. Signals generated in the individual pixels of the pixel region 105 can be output from the radiation imaging panel 100' via the connecting terminal portion.

In this example, the readout circuit and the driving circuit are arranged outside the radiation imaging panel 100'. However, the readout circuit and the driving circuit may also be arranged in the radiation imaging panel 100'. Even in this case, the connecting terminal portion (not shown) can be formed on the substrate 101, and signals generated in the individual pixels of the pixel region 105 can be output from the radiation imaging panel 100' via the connecting terminal portion (not shown).

In this embodiment, the protective layer 108 further includes the base 110 which is arranged on the second resin layer 106 and the metal layer 109 which is arranged between the second resin layer 106 and the base 110. However, the arrangement of the protective layer 108 is not limited to this. For example, the protective layer 108 may have a two-layer structure formed by the first resin layer 103 and the second resin layer 106. Alternatively, for example, the protective layer 108 may have a three-layer structure in which the base 110 is arranged on the second resin layer 106. Alternatively, for example, the protective layer 108 may have a three-layer structure in which the metal layer 109 is arranged on the second resin layer 106. Furthermore, the protective layer 108 may have, for example, a structure formed by five or more layers.

The scintillator 102 converts radiation that enters the scintillator 102 into light detectable by the photoelectric conversion elements arranged in the pixel region 105 of the substrate 101. For example, the scintillator 102 can convert the radiation into visible light. An alkali metal halide such as cesium iodide (CsI) or the like that can grow the columnar crystals 112 can be used as the scintillator 102. If CsI is used as the scintillator 102, thallium iodide (TlI) can be used as an activator.

The scintillator 102 made of an alkali metal halide can be formed by, for example, vapor deposition. The substrate 101 can be placed in a vapor deposition apparatus so that the surface, of the substrate 101, on the side on which the pixel region 105 is formed will be the vapor deposition surface, and codeposition will be performed by filling cell vessels with CsI and TlI such that the Tl concentration is 1 mol % with respect to CsI, and heating these materials. The scintillator 102 containing the plurality of columnar crystals 112 is formed as a result. The light emitted from the scintillator made of CsI and using TlI as the activator has a peak wavelength $\lambda$ of about 550 nm or can have a wide light emission wavelength of about 400 nm to about 750 nm.

The protective layer 108 is formed on the scintillator 102. The scintillator 102 that is formed by the plurality of columnar crystals 112 containing alkali metal halide will deteriorate due to moisture absorption. Hence, the protective layer 108 functions as a moisture preventing layer of the scintillator 102. By making the protective layer 108 that covers the scintillator 102 have the function of a moisture preventing layer, it will be possible to prevent the scintillator 102 from deteriorating due to moisture absorption.

The first resin layer 103 of the protective layer 108 will be described next. The first resin layer 103 of the protective layer 108 contains the metal compound particles 104. By adding the metal compound particles 104 to the first resin layer 103, rays of light, among the rays of light generated by the scintillator 102, which enter the side of the first resin layer 103 will be reflected in a short optical path length and can be made to reenter the columnar crystals 112 of the scintillator 102 from which they were emitted. As a result, it will be possible to suppress the diffusion of light that enters the side of the first resin layer 103, and the radiation imaging panel 100' in which the degradation of MTF (Modulation Transfer Function) has been suppressed can be implemented.

The metal compound particles 104 to be contained in the first resin layer 103 will be further described here. As described above, the particles 104 need to reflect the rays of light, among the rays of light generated by the scintillator 102, which enter the side of the first resin layer 103 in a short optical path length and make the reflected rays of light reenter the columnar crystals 112 of the scintillator 102 from which they were emitted. Thus, the metal compound particles 104 contained in the first resin layer 103 may be set to have an average particle diameter $d_1$ that will make the light having the peak wavelength $\lambda$ emitted from the scintillator 102 scatter according to Rayleigh scattering. That is, it will increase the probability that the light that entered the metal compound particles 104 contained in the first resin layer 103 will reenter the columnar crystals 112 of the scintillator 102 when Rayleigh scattering of light with a high directivity is caused by the metal compound particles 104. This will suppress the degradation of the MTF.

The scintillator 102 made of alkali metal halide can have a light emission peak of a wavelength of about 400 nm to about 800 nm depending on the activator. Also, the sensitivity characteristic of each photoelectric conversion element is about 500 nm to about 800 nm. The above-described effect of Rayleigh scattering will appear when the particle diameter is set to a size which is approximately ½ or less with respect to the wavelength of the light. Hence, the probability that the light that entered the metal compound particles 104 will be reflected in the incident direction of light can increase when the particle diameter $d_1$ of each of the metal compound particles 104 contained in the first resin layer 103 will be 200 nm or more and 400 nm or less.

In addition, if a range of light emitted by the scintillator 102 from the side of the short wavelength to the side of the long wavelength is defined as a range from $\lambda_1$ to $\lambda_2$, it may be set so that the average particle diameter $d_1$ of the metal compound particles 104 contained in the first resin layer 103 will satisfy $\lambda_1/2 < d_1 < \lambda_2/2$. As described above, the CsI using TlI as the activator can have a wide light emission wavelength of about 400 nm to about 750 nm. Hence, if the average particle diameter $d_1$ of the metal compound particles 104 contained in the first resin layer 103 is 200 nm or more and 400 nm or less, it can increase the probability that the light that entered the metal compound particles 104 of the first resin layer 103 will be reflected to the side of the incident direction of light.

The film thickness of the first resin layer 103 will be considered next. In a case in which the first resin layer 103 in which the metal compound particles 104 are dispersed is too thick, the light will diffuse in the first resin layer 103, and the MTF improvement effect can become insufficient. On the other hand, in a case in which the first resin layer 103 is too thin, the thickness of the first resin layer 103 will become uneven more easily. When the present inventors actually manufactured the first resin layer 103, it was difficult to make the first resin layer 103 have a uniform thickness when the thickness of the first resin layer 103 was less than 10 µm. That is, the thickness of the first resin layer 103 needs to be 10 µm or more. In addition, it was also found that the MTF improvement effect will become insufficient because the light will diffuse in the first resin layer 103 if the film thickness of the first resin layer 103 exceeds 40 µm. Hence, the thickness of the first resin layer 103 may be less than 40 µm. Furthermore, the thickness of the first resin layer 103 may be less than 30 µm. That is, the thickness of the first resin layer 103 may be 10 µm or more and less than 30 µm. Assume here that the thickness of the first resin layer 103 refers to the thickness of the first resin layer 103 from the vertex portion of each of the plurality of columnar crystals 112 of the scintillator 102 to the upper surface of the first resin layer 103. The vertex portions of the respective columnar crystals 112 of the scintillator 102 can be portions, of the respective columnar crystals 112 of the scintillator 102, which are farthest from the substrate 101.

The second resin layer 106 arranged on the first resin layer 103, in other words, arranged on a side, which is opposite to scintillator 102, of the first resin layer 103 will be described next. The second resin layer 106 of the protective layer 108 contains metal compound particles 111. An average particle diameter $d_2$ of the metal compound particles 111 contained in the second resin layer 106 may be a particle diameter that will make the light having the peak wavelength emitted from the scintillator 102 scatter according to Mie scattering. Among the rays of light emitted from the scintillator 102, there can be rays of light that will pass through the first resin layer 103 and will enter the second resin layer 106. The metal compound particles 111 contained in the second resin layer 106 will reflect this light that entered the second resin layer 106 by Mie scattering that reflects the light in all directions without depending on the wavelength of the incident light. The light that enters the second resin layer 106 will attenuate while being repetitively scattered by the metal compound particles 111. That is, it will be possible to prevent the light having a long optical path length that was emitted from the scintillator 102, passed through the first resin layer 103, and entered the second resin layer 106 from reentering the first resin layer 103 (and furthermore, the scintillator 102). As a result, the MTF can be improved.

Mie scattering is a phenomenon that is caused by a particle that has a particle diameter which is equal to or more than the degree of wavelength of incident light. That is, letting the wavelength $\lambda$ be the peak wavelength of light emitted by the scintillator 102, the average particle diameter $d_2$ of the metal compound particles 111 contained in the second resin layer 106 may satisfy $d_2 \geq \lambda$.

Also, as described above, the scintillator 102 made of alkali metal halide can have a light emission peak of a wavelength of about 400 nm to about 800 nm depending on the activator. Hence, the average particle diameter $d_2$ of the metal compound particles 111 contained in the second resin layer 106 may be 400 nm or more. Furthermore, since the peak wavelength $\lambda$ of light emitted by the CsI scintillator using TlI as the activator is about 550 nm, the average particle diameter $d_2$ of the metal compound particles 111 contained in the second resin layer 106 may be 550 nm or more.

On the other hand, if the average particle diameter $d_2$ of the metal compound particles 111 contained in the second resin layer 106 exceeds 1,000 nm, the thickness of the second resin layer 106 will become uneven more easily when the second resin layer 106 is formed. Hence, the average particle diameter $d_2$ of the metal compound particles 111 contained in the second resin layer 106 may be 400 nm or more and 1,000 nm or less. Furthermore, considering a case in which CsI containing Tl is to be used as the scintillator 102, the average particle diameter $d_2$ of the metal compound particles 111 contained in the second resin layer 106 may be 550 nm or more and 1,000 nm or less.

Example of Radiation Imaging Panel 100'

A manufacturing method and an MTF improvement effect of the radiation imaging panel 100' will be described next with reference to an example. First, 550-mm×445-mm non-alkali glass having a thickness of 500 µm was prepared as the substrate 101. The substrate 101 is not limited to glass, and for example, a resin substrate or a semiconductor substrate such as silicon or the like may be used. Next, the pixel region 105 was formed by repetitively performing a deposition step of depositing a semiconductor layer such as silicon (for example, amorphous silicon) and a metal (for example, aluminum) for forming a wiring layer and the like, a photolithography step, an etching step, and the like on the glass substrate 101. A plurality of pixels, each including a light converting element for generating electric charge corresponding to the light emission of the scintillator 102 and a switching element for outputting a signal corresponding to the generated electric charge, were arranged in the pixel region 105. In addition, a connection terminal portion (not shown) for driving the pixels and for transmitting the obtained signals to an external circuit was formed in the pixel region 105.

After the pixel region 105 was formed, an array inspection for checking the operations of the pixels formed in the pixel region 105 was performed. In the array inspection, the fact that the photoelectric conversion elements and the switching elements formed in the pixel region 105 are operating well and the fact that there is no defective pixel or there are only a few defective pixels were confirmed. After the execution of the array inspection, the pixel protecting layer 107 was formed for the purpose of protecting the connection terminal portion (not shown), by masking the periphery of the substrate 101 with a masking film. More specifically, the pixel protecting layer 107 was formed by placing the substrate 101 in a spray spin coater, spinning the substrate 101 at a rotational speed of approximately 100 rpm while spraying a polyimide solution, and subsequently drying and annealing the substrate 101 at a temperature of 220° C. In this example, the pixel protecting layer 107 having a thickness of, for example, approximately 2 μm was formed.

After preparing the substrate 101 in which the pixel region 105 has been formed, the scintillator 102 was formed next. First, a vapor deposition mask was set on a region, where no scintillator 102 is to be formed, of the substrate 101 on which the pixel protecting layer 107 was formed, and the substrate 101 was placed in a vapor deposition apparatus so that the side of the substrate 101 on which the pixel protecting layer 107 was arranged will be a vapor deposition surface. Codeposition was performed thereafter by filling cell vessels with CsI and Tl so that the Tl concentration would be 1 mol % with respect to CsI, and heating the filled cell vessels. When the vapor deposition of the scintillator 102 was performed, the vapor deposition apparatus was evacuated to $10^{-3}$ Pa, and heating was subsequently performed by using a lamp heater so that the temperature of the surface of the substrate 101 would become 175° C. In this example, the scintillator 102 had a thickness of 380 μm and a film filling rate of 75%. At this time, the outer edges of the scintillator 102 can be arranged closer to the outer side than the outer edges of the pixel region 105.

A method of forming the first resin layer 103, of the protective layer 108, which is arranged so as to cover the scintillator 102 and to which the metal compound particles 104 have been added will be described next. In this example, a hot melt resin mainly containing a polyolefin resin was used as the resin for forming the first resin layer 103. The hot melt resin is defined as an adhesive resin that contains neither water nor a solvent, is a solid at room temperature, and is made of a 100%-nonvolatile thermoplastic material (Thomas P. Flanagan, Adhesives Age, vol. 9, No. 3, pp. 28 (1966)). Also, the hot melt resin has a property of melting when the resin temperature rises and solidifying when the resin temperature lowers. The hot melt resin is a resin that is adhesive to another organic material and an inorganic material in a heated molten state, and is not adhesive in a solid state at room temperature. In addition, the hot melt resin neither contains a polar solvating medium, a solvent, nor water. Hence, even if the hot melt resin comes in contact with the scintillator 102 which contains the alkali halide columnar crystals 112, the possibility that the hot melt resin will dissolve the scintillator 102 will be low. Therefore, the first resin layer 103 that uses the hot melt resin can also have the function of a moisture preventing layer (protective layer) with respect to the scintillator 102.

The hot melt resin is classified in accordance with the type of a base polymer (base material) as a main component. It is possible to use polyolefin-based, polyester-based, and polyamide-based resins as the base polymer for forming the first resin layer 103. When using the hot melt resin as the protective layer 108 (the first resin layer 103) of the scintillator 102, it is important for the resin to have a high moisture proofness and a high light transparency for transmitting visible light generated from the scintillator 102.

The material for forming the first resin layer 103 is not limited to the hot melt resin. For example, a resin having pressure-sensitive adhesiveness obtained by an intermolecular force, that is, a resin that is a so-called adhesive may be used as the resin for forming the first resin layer 103. In this case, a urethane resin, an acrylic resin, or the like can be used as the resin for forming the first resin layer 103. For example, as an acrylic resin, a polymethyl methacrylate resin (PMMA) may be used as the first resin layer 103.

In this example, the first resin layer 103 was formed by dissolving a polyolefin resin in a toluene-xylene solvent mixture, and the viscosity was further adjusted to be about 10 cps. In addition, the metal compound particles 104 were dispersed together with a dispersant in a solution mixture of butanol and propanol in advance. Thereafter, a material obtained by dissolving a resin such as a polyolefin resin in the toluene-xylene solution mixture was added to this, and the resultant mixture was sufficiently crushed by using a ball mill. This resultant dispersion was mixed, stirred, and passed through a three roll mill to obtain a resin solution in which the metal compound particles 104 have dispersed without any clumps.

Next, a PET film roll having a thickness of 30 μm and a releasing action was set to a roll coater apparatus. This PET film was coated with the resin solution to be the first resin layer 103 which was adjusted in the above-described manner, and the coated PET film was dried to form the first resin layer 103. In this manner, a thermoplastic resin film which has a thickness of 30 μm and is to be used as the first resin layer 103 in which the metal compound particles 104 have been dispersed was obtained.

The metal compound particles 104 may be, for example, metal oxide particles. A material having a refractive index higher than that of the scintillator 102 can be used as the metal compound particles 104. For example, when above-described CsI (refractive index (n): 1.78 to 1.84 (depending on the type of activator or the like)) is used as the scintillator 102 made of an alkali metal halide, a material having a refractive index higher than that of CsI can be used. For example, white lead ($2PbCo_3.Pb(OH)_2$) (n: 1.94 to 2.09), zinc oxide (n: 2.0), yttrium oxide (n: 1.91), zirconium oxide (n: 2.20), titanium oxide (n: 2.50 to 2.72), or the like can be used as the metal compound particles 104. For example, the refractive index of the metal compound particles 104 can be 1.94 or more and 2.72 or less. In this example, rutile-type titanium dioxide particles (n: 2.72) that have a refractive index higher than those of other titanium oxides were used as the metal compound. However, the present invention is not limited to this, and various kinds of materials with a high reflection property can be used as the metal compound particles 104. For example, a material such as barium sulfate, magnesium oxide, or the like may be used as the metal compound particles 104.

The refractive index of each metal compound particle 104 may be higher than that of the resin forming the first resin layer 103. By increasing the difference between the refractive index of each metal compound particle 104 and the refractive index of the first resin layer 103, light can be reflected more easily by the surfaces of the metal compound particles 104 in the first resin layer 103. The refractive index of the above-described hot melt resin is about 1.52, the refractive index of a urethane resin is about 1.49, and the refractive index of an acrylic resin is about 1.49 to 1.53.

In this example, rutile-type titanium dioxide particles having the average particle diameter $d_1$ of 150 nm or 225 nm were used as the metal compound particles 104 to be added to the first resin layer 103. Also, the concentration of the metal compound particles 104 to be dispersed in the first resin layer 103 was set to 7.1 vol % when the particle diameter $d_1$ was 150 nm, and 1.8 vol %, 4.0 vol %, 7.1 vol %, 11.1 vol %, and 19.5 vol % when the particle diameter $d_1$ was 225 nm.

A method of forming the second resin layer 106 will be described next. In this example, the second resin layer 106 was formed by forming a resin layer to be the second resin layer 106 on the base 110 made of a 30-μm PET film on which on which aluminum has been deposited as the metal layer 109 at a thickness of 12 μm. That is, the metal layer 109 is arranged between the second resin layer 106 and the base 110. A material similar to that of the first resin layer 103, such as the above-described hot melt resin, a urethane resin, an acrylic resin, or the like can be used as the resin for forming the second resin layer 106.

The first resin layer 103 and the second resin layer 106 may contain resins that have the same chemical composition. In other words, the first resin layer 103 and the second resin layer 106 may be made of the same resin. If the first resin layer 103 and the second resin layer 106 are formed by using the same resin, the process for forming each layer can be simplified because there will be no need to deal with a plurality of materials. Also, it will be possible to maintain high thermal, mechanical, and chemical stabilities between the first resin layer 103 and the second resin layer 106. In this example, in a similar manner to the first resin layer 103, a hot melt resin mainly containing a polyolefin resin was used as the resin for forming the second resin layer 106. The first resin layer 103 was formed on a PET film which has a thickness of 30 μm and a releasing action. The second resin layer 106 was formed by using a method similar to the first resin layer 103 described above other than in the fact that the base 110 made of the PET film on which the metal layer 109 was used instead of only the PET film.

Various kinds of materials with high reflectivity as those described above can be used as the metal compound particles 111 to be contained in the second resin layer 106. In this example, rutile-type titanium dioxide particles whose average particle diameter $d_2$ is 225 nm, 550 nm, or 800 nm were used as the metal compound particles 111 to be contained in the second resin layer 106. In addition, the concentration of the metal compound particles 111 to be dispersed in the second resin layer 106 was set to 7 vol %, and the film thickness of the second resin layer 106 was set to 30 μm.

In this example, particles with different particle diameters, but made of the same material were used for the metal compound particles 104 contained in the first resin layer 103 and the metal compound particles 111 contained in the second resin layer 106. However, the present invention is not limited to this. The metal compound particles 104 of the first resin layer 103 and the metal compound particles 111 of the second resin layer 106 may use different metal compounds. For example, titanium dioxide may be used as the metal compound particles 104 contained in the first resin layer 103, and barium sulfate may be used as the metal compound particles 111 of the second resin layer 106.

Next, in this example, the first resin layer 103 and the second resin layer 106 were stacked in accordance with the following processes. The first resin layer 103 formed according to the above-described method was overlayed on the second resin layer 106, which was formed on the base 110 made of a PET film, and the resultant material was set in a vacuum thermal transfer apparatus. The second resin layer 106 was formed, as described above, on the metal layer 109 which was formed by depositing aluminum onto the base 110. Next, the first resin layer 103 and the second resin layer 106 were heated at a temperature of 50° C., which is the temperature near the glass transition point of the hot melt resin mainly containing a polyolefin resin, so as to stack the first resin layer 103 and the second resin layer 106 and make the first resin layer 103 and the second resin layer 106 adhere to each other. At this time, it was confirmed that the first resin layer 103 and the second resin layer 106 were stacked in a sufficiently adhered state.

After the protective layer 108 in which the first resin layer 103 and the second resin layer 106 were stacked was formed, the radiation imaging panel 100' shown in FIG. 7 was manufactured by using a vacuum thermal transfer apparatus or the like to adhere the protective layer 108 to the substrate 101 on which the scintillator 102 was formed. The substrate 101 and the protective layer 108 were set in the vacuum thermal transfer apparatus so that the first resin layer 103 of the protective layer 108 would face the scintillator 102 of the substrate 101, on which the scintillator 102 was formed. At this time, the PET film, which has the releasing action, used to form the first resin layer 103 has been peeled off. After aligning the substrate 101 and the protective layer 108 by using the alignment marks, the scintillator 102 and the first resin layer 103 were brought into contact with each other at a temperature of 30° C. Next, air bubbles were removed by lowering the pressure in the vacuum thermal transfer apparatus to $10^{-1}$ Pa. Furthermore, the temperature was increased to 70° C. to 100° C. while a pressure was applied between the substrate 101 and the protective layer 108, and the substrate 101 on which the scintillator 102 was formed and the first resin layer 103 which forms the protective layer 108 were adhered to each other by maintaining this pressure applied state for an appropriate time.

Subsequently, a driving substrate or the like was connected, via an anisotropic conductive film, to the connecting terminal portion (not shown) of the substrate 101 to which the protective layer 108 including the first resin layer 103 and the second resin layer 106 were adhered. Furthermore, a sheet for increasing the strength of the radiation imaging panel 100' was adhered on the side, of the substrate 101, opposite to the scintillator 102. The radiation imaging panel 100' according to this example was manufactured based on the above-described processes.

An MTF improvement effect according to this embodiment will be described next. The radiation imaging panel 100' was manufactured by using the manufacturing method as described above. In addition, as a comparative example, a radiation imaging panel formed without the metal compound particles in the protective layer 108, but otherwise formed by using processes similar to those described above was manufactured.

FIG. 8 shows the MTF values obtained when the amount of metal compound particles contained in the first resin layer 103 was changed in a case in which the average particle diameter $d_1$ of the metal compound particles 104 contained in the first resin layer 103 was 225 nm and the average particle diameter $d_2$ of the metal compound particles 111 contained in the second resin layer 106 was 800 nm. In addition, FIGS. 9A and 9B are tables summarizing the sensitivities and the MTF values of the radiation imaging panels 100' of respective examples manufactured by combining particle diameters $d_1$ and $d_2$ of the above-described metal compound particles and the concentration of the metal compound particles in the first resin layer 103 and the sensitivity and the MTF value of the comparative example. The MTF values shown in FIGS. 8 and 9 are MTF values obtained when measurement was performed by irradiating the radiation imaging panel 100' of each example and the radiation imaging panel of the comparative example with an X-ray at 2 lp/mm in compliance with radiation quality RQAS of the international standards.

It can be seen from FIGS. 8 and 9 that the MTF value improved by adding the metal compound particles 104 and 111 to the first resin layer 103 and the second resin layer 106, respectively. In addition, when the concentration of the metal compound particles 104 in the first resin layer 103 was less than 7.5 vol %, it can be seen that the MTF value particularly improved more than when the concentration is 7.5 vol % or more. Also, according to an experiment by the present inventors, an effect of improving the MTF value was obtained when the concentration of the metal compound particles 104 of the first resin layer 103 was 0.1 vol % to 0.15 vol % or more. Hence, the concentration of the metal compound particles 104 of the first resin layer 103 may be 0.15 vol % or more and less than 7.5 vol %.

In addition, it was found that the MTF value improved more when the average particle diameter $d_2$ of the metal compound particles 111 contained in the second resin layer 106 was one of 550 nm and 800 nm, which are diameters having a high likelihood that the light generated from the scintillator 102 will result in Mie scattering, than when the particle diameter $d_2$ is 225 nm. Furthermore, it was found that the MTF value improved even more when the average particle diameter $d_2$ of the metal compound particles 111 contained in the second resin layer 106 was 800 nm than when the average particle diameter $d_2$ was 550 nm. Also, according to the experiment by the present inventors, the effect of improving the MTF values could be obtained more than the comparative example when the concentration of the metal compound particles 111 of the second resin layer 106 was 0.1 vol % to 0.15 vol % or more. Hence, the concentration of the metal compound particles 111 of the second resin layer 106 may be 0.15 vol % or more.

In addition, although the film thickness of the second resin layer 106 was 30 μm, it may be 30 μm or less or may be 30 μm or more. However, in a similar manner to the first resin layer 103, it can be difficult to make the second resin layer 106 have a uniform thickness when the thickness of the second resin layer 106 is less than 10 μm. Hence, the film thickness of the second resin layer 106 may be 10 μm or more. Also, if the second resin layer 106 has a small film thickness, there is a possibility that the light that entered the second resin layer 106 may not attenuate sufficiently and may reenter the first resin layer 103 even in a case in which Mie scattering has been generated by the metal compound particles 111 in the second resin layer 106. Hence, the film thickness of the second resin layer 106 may be 20 μm or more. In addition, the upper limit of the film thickness of the second resin layer 106 need not be particularly limited when the MTF value of the radiation imaging panel 100' is considered. However, the upper limit can be appropriately set in consideration of the time and cost needed to manufacture the second resin layer 106, the weight of the second resin layer 106, and the like.

In addition, the refractive index n1 of the first resin layer 103 and the refractive index n2 of the second resin layer 106 may satisfy n1>n2. In a case in which the refractive index n1 of the first resin layer 103 is greater than the refractive index n2 of the second resin layer 106, the light that passed through the first resin layer 103 and entered the second resin layer 106 will be prevented from reentering the first resin layer 103. This can improve the MTF. Since the same hot melt resin was used for the first resin layer 103 and the second resin layer 106 in the example described above, the relation of the refractive index n1 of the first resin layer 103 and the refractive index n2 of the second resin layer 106 was n1=n2.

Another modification of the radiation imaging panel 100 will be described next. The concentration distribution of the light reflecting particles disclosed in Japanese Patent Laid-Open No. 2006-052980 has room for consideration. More specifically, between the columnar crystals of the scintillator, the light reflecting particles need to be arranged so that the light will not enter adjacent columnar crystals to improve the MTF (Modulation Transfer Function). On the other hand, the DQE (Detective Quantum Efficiency) can improve if the light reflecting particles are present in the upper portion of the columnar crystals and the light emitted upward from the columnar crystals of the scintillator reenter the columnar crystals upon being reflected by the light reflecting particles. However, there is a possibility that the MTF improvement effect will not be obtained because the light emitted upward from the columnar crystals will be diffused by the light reflecting particles.

Figure 10:
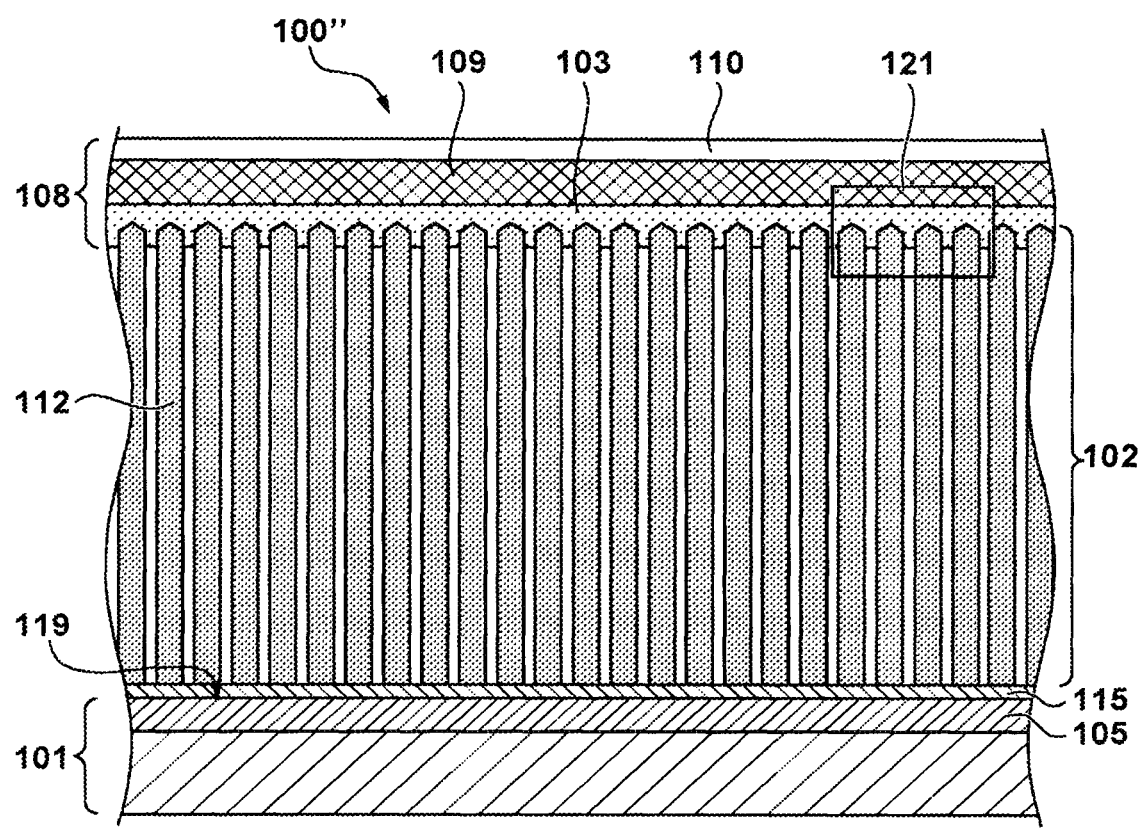
FIG. 10 is a sectional view showing another modification of the radiation imaging panel of FIG. 1.

An arrangement and a manufacturing method of a radiation imaging panel according to this embodiment which is another modification of the radiation imaging panel 100 will be described with reference to FIGS. 10 to 15. FIG. 10 is a view showing a modification of the sectional structure of the radiation imaging panel 100 shown in FIG. 1. A radiation imaging panel 100" according to this embodiment includes the substrate 101 including the pixel region 105 which is formed by arranging a plurality of pixels each including a photoelectric conversion element on a principal surface 119, the scintillator 102 containing the plurality of columnar crystals 112 arranged on the principal surface 119 of the substrate 101, and the protective layer 108 including the resin layer 103 arranged so as to cover the scintillator 102. A planarization layer 115 for reducing the steps due to transistors and wiring layers formed on the principal surface 119 of the substrate 101 may be arranged between the substrate 101 and the scintillator 102.

In the pixel region 105, a plurality of pixels can be arranged in the form of a two-dimensional array. For example, 3,300×2,800 pixels can be arranged on a 550-mm× 445-mm substrate 101. Of the 3,300×2,800 pixels, it is possible to use 10 pixels arranged on the outer circumference as a dummy pixel region, and form an effective pixel region of the pixel region 105 by using 3,280×2,780 pixels arranged inside the dummy pixels. It is possible to appropriately set the number of pixels to be arranged in the pixel region 105, and the number of pixels to be arranged in the effective pixel region of the pixel region 105, in accordance with, for example, the size of the substrate 101 and an object to be imaged.

In the pixel region 105 arranged in the substrate 101, it is possible to form column signal lines for extracting signals generated in the individual pixels, and row signal lines for driving the individual elements including these pixels arranged in the pixel region 105. The column signal lines and the row signal lines can electrically be connected to a readout circuit substrate and a driving circuit substrate via a flexible circuit board. The substrate 101 can have a connecting terminal portion (not shown) in order to connect the column signal lines and the row signal lines to the readout circuit substrate and the driving circuit substrate. Signals generated in the individual pixels of the pixel region 105 can be output from the radiation imaging panel 100" via the connecting terminal portion.

In this example, the readout circuit and the driving circuit are arranged outside the radiation imaging panel 100". However, the readout circuit and the driving circuit may also be arranged in the radiation imaging panel 100". Even in this case, the connecting terminal portion (not shown) can be formed on the substrate 101, and signals generated in the individual pixels of the pixel region 105 can be output from the radiation imaging panel 100" via the connecting terminal portion (not shown).

In this embodiment, the protective layer 108 further includes a base 110 arranged on a side, of the resin layer 103, which is opposite to the scintillator 102, and a metal layer arranged between the resin layer 103 and the base 110. For example, the protective layer 108 may be manufactured by forming the metal layer 109 made of aluminum on the base 110 and forming the resin layer 103 on the metal layer 109.

The scintillator 102 converts radiation that enters the scintillator 102 into light detectable by the photoelectric conversion elements arranged in the substrate 101. For example, the scintillator 102 can convert the radiation into visible light. An alkali metal halide such as cesium iodide (CsI) or the like that can grow the columnar crystals 112 can be used as the scintillator 102. If CsI is used as the scintillator 102, thallium iodide (TlI) can be used as an activator.

The scintillator 102 can be formed by, for example, vapor deposition. The substrate 101 can be placed in a vapor deposition apparatus so that the planarization layer 115 will be the vapor deposition surface, and codeposition will be performed by filling cell vessels with CsI and TlI such that the Tl concentration is 1 mol % with respect to CsI, and heating the materials. As a result, the scintillator 102 that contains the plurality of columnar crystals 112 is formed.

The resin layer 103 is formed on the scintillator 102. The scintillator 102 formed by the plurality of columnar crystals 112 containing an alkali metal halide will deteriorate due to moisture absorption. Hence, the resin layer 103 may also function as a moisture preventing layer of the scintillator 102. By arranging so that the resin layer 103 which covers the scintillator 102 will have a moisture preventing function, it will be possible to prevent the scintillator 102 from deteriorating due to moisture absorption.

Figure 11A:
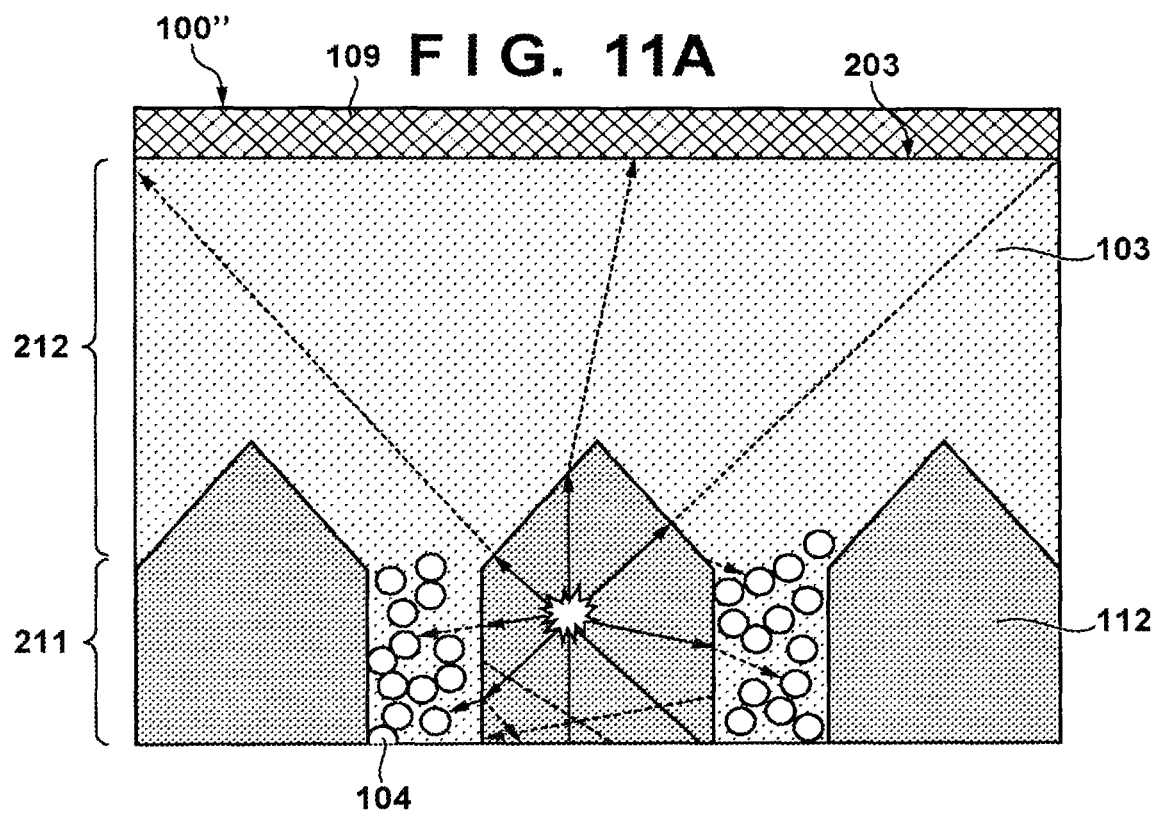
FIGS. 11A and 11B are views each showing the arrangement of the radiation imaging panel of FIG. 10.

FIG. 11A is an enlarged view of a portion 121 of FIG. 10. A hot melt resin mainly containing a polyolefin resin may be used as the resin layer 103. The hot melt resin is defined as an adhesive resin that contains neither water nor a solvent, is a solid at room temperature, and is made of a 100%-nonvolatile thermoplastic material (Thomas P. Flanagan, Adhesives Age, vol. 9, No. 3, pp. 28 (1966)). Also, the hot melt resin has a property of melting when the resin temperature rises and solidifying when the resin temperature lowers. The hot melt resin is a resin that is adhesive to another organic material and an inorganic material in a heated molten state, and is not adhesive in a solid state at room temperature. In addition, the hot melt resin neither contains a polar solvating medium, a solvent, nor water. Hence, even if the hot melt resin comes in contact with the scintillator 102 which contains the alkali halide columnar crystals 112, the scintillator 102 will not dissolve, and the function of a protective layer can be provided.

The hot melt resin is classified in accordance with the type of a base polymer (base material) as a main component, and it is possible to use a polyolefin-based resin, a polyester-based resin, a polyamide-based resin, or the like. When the hot melt resin is to be used to form the resin layer 103 as the protective layer 108 of the scintillator 102, it is important for the resin to have a high moisture proofness and a high light transparency for transmitting visible light generated from the scintillator 102.

The material for forming the resin layer 103 is not limited to the hot melt resin. For example, a resin having pressure-sensitive adhesiveness obtained by an intermolecular force, that is, a resin that is a so-called adhesive may be used as the resin for forming the resin layer 103. In this case, a urethane resin, an acrylic resin, or the like can be used as the resin for forming the resin layer 103. For example, as an acrylic resin, a polymethyl methacrylate resin (PMMA) may be used as the resin layer 103.

A region between the principal surface 119 of the substrate 101 and an upper surface 203 of the resin layer 103 shown in FIGS. 10 and 11A will be defined as follows. Let a first region 211 be the regions between the sets of adjacent columnar crystals 112 of the plurality of columnar crystals 112 of the scintillator 102. Let a second region 212 be a region which is between the upper surface 203 of the resin layer 103 and the plurality of columnar crystals 112 and the first regions 211, and is a region where the resin layer 103 is to be arranged. Assume here that the first region 211 is a region in which the ratio of the plurality of columnar crystals 112 of the scintillator 102 in a plane parallel to the principal surface 119 of the substrate 101 will be 75% or more and 98% or less. As shown in FIG. 11A, the metal compound particles 104 are arranged in this first region 211.

Figure 12:
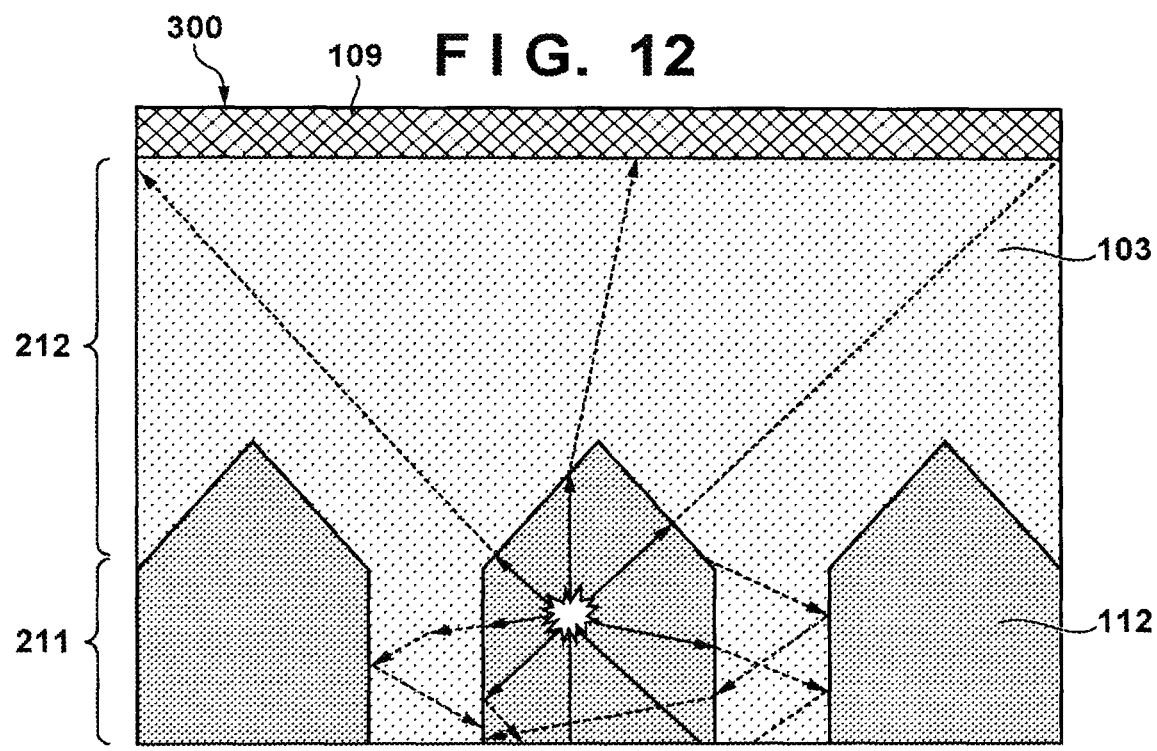
FIG. 12 is a view showing the arrangement of a comparative example of the radiation imaging panel of FIG. 10.

FIG. 12 shows a sectional view of a radiation imaging panel 300 of a comparative example. Since metal compound particles are not arranged in the first region 211 in the radiation imaging panel 300 according to the comparative example, the rays of light generated from the columnar crystals 112 of the scintillator 102 can spread in the first region 211 in a horizontal direction of FIG. 12. As a result, the MTF can degrade due to the attenuation of light, which is generated simultaneously with the scattering of light, being promoted by the repetitive reflection and refraction of the rays of light in the first region 211.

On the other hand, in this embodiment, as shown in FIG. 11A, the metal compound particles 104 are arranged in the first region 211. Due to the arrangement of the metal compound particles 104, the possibility that the rays of light emitted from the columnar crystals 112 will be reflected by the columnar crystals 112 from which they were emitted will increase. As a result, the scattering of light can be suppressed in the first region 211, and the MTF can improve.

The metal compound particles 104 may be metal oxide particles. A material having a refractive index higher than that of the scintillator 102 can be used as the metal compound particles 104. For example, when above-described CsI (refractive index (n): 1.78 to 1.84 (depending on the type of activator or the like)) is used as the scintillator 102 of an alkali metal halide, a material having a refractive index higher than that of CsI can be used. For example, white lead ($2PbCo_3 \cdot Pb(OH)_2$) (n: 1.94 to 2.09), zinc oxide (n: 2.0), yttrium oxide (n: 1.91), zirconium oxide (n: 2.20), titanium oxide (n: 2.50 to 2.72), or the like can be used as the metal compound particles 104. For example, the refractive index of the metal compound particles 104 can be 1.94 or more and 2.72 or less. Also, for example, rutile-type titanium dioxide particles that have a high refractive index among titanium oxides can used as the metal compound.

Furthermore, the refractive index of each metal compound particle 104 may be higher than that of the resin forming the first resin layer 103. By increasing the difference between the refractive index of each metal compound particle 104 and the refractive index of the first resin layer 103, light can be reflected more easily by the surfaces of the metal compound particles 104 in the first region 211. The refractive index of the above-described hot melt resin is about 1.52, the refractive index of a urethane resin is about 1.49, and the refractive index of an acrylic resin is about 1.49 to 1.53.

Also, the average particle size of the metal compound particles 104 can be 200 nm or more and 500 nm or less. The sensitivity characteristic of a photoelectric conversion element is generally 500 nm to 800 nm, but the effect of Rayleigh scattering will appear if the size of the particles are ½ or less than the wavelength of light. This will increase the probability that the light which enters each particle 104 will be reflected to the side of the incident direction of light. For example, rutile-type titanium dioxide particles having an average particle size of 250 nm and a particle size distribution in which 10% diameter $D_{10}$=195 nm, 50% diameter (median diameter) $D_{50}$=245 nm, or 90% diameter $D_{90}$=275 nm can be used as the metal compound particles 104.

Figure 11B:
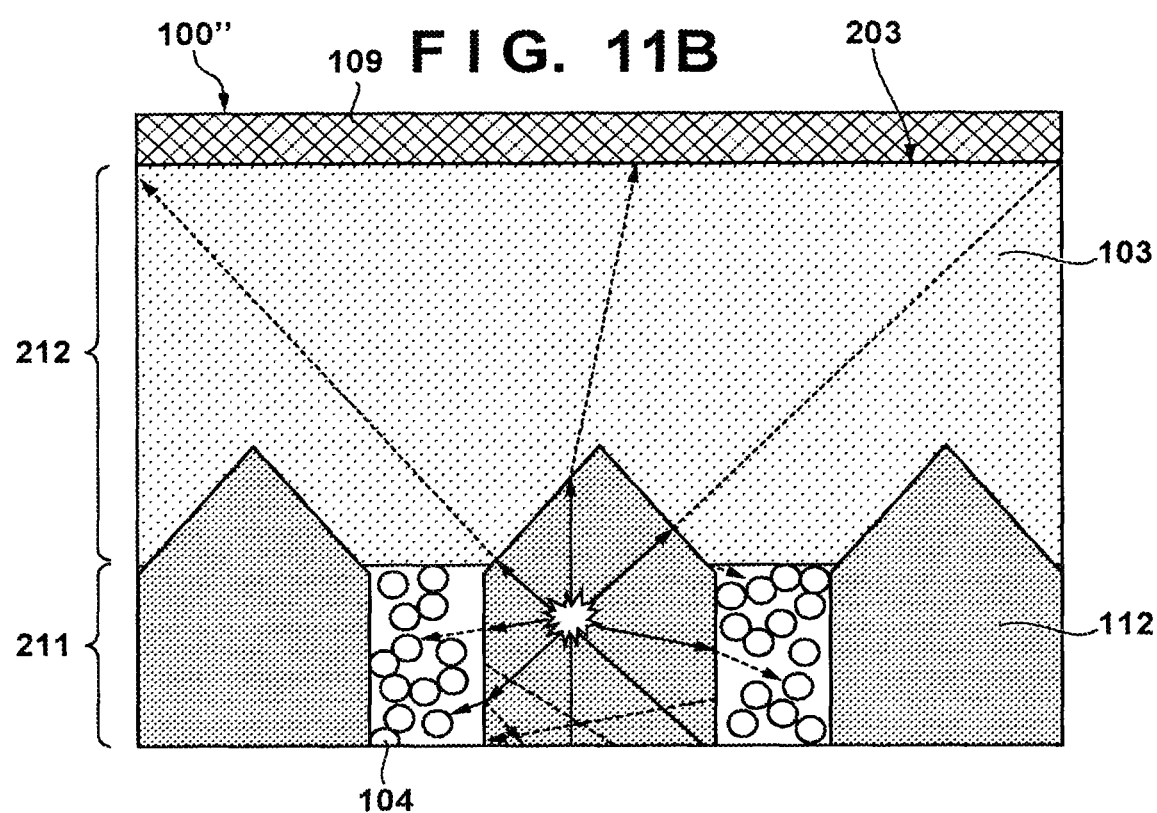

In the arrangement shown in FIG. 11A, a part of the resin layer 103 is arranged on the first region 211. Also, in the first region 211, the metal compound particles 104 are arranged in the resin layer 103. However, as shown in FIG. 11B, the resin layer 103 may not be arranged in the first region 211. The refractive index of the space (air layer) of the first region 211 will decrease when the resin layer 103 is not arranged in the first region 211. This will increase the difference between the refractive indexes of the air layer of the first region 211 and the columnar crystals 112, thereby making it difficult for the rays of light to be emitted from the columnar crystals 112. This will also increase the difference between the refractive indexes of the air layer of the first region 211 and the metal compound particles 104, and the rays of light emitted from the columnar crystals 112 can be reflected more efficiently by the metal compound particles 104. The MTF can further improve as a result.

Figure 13:
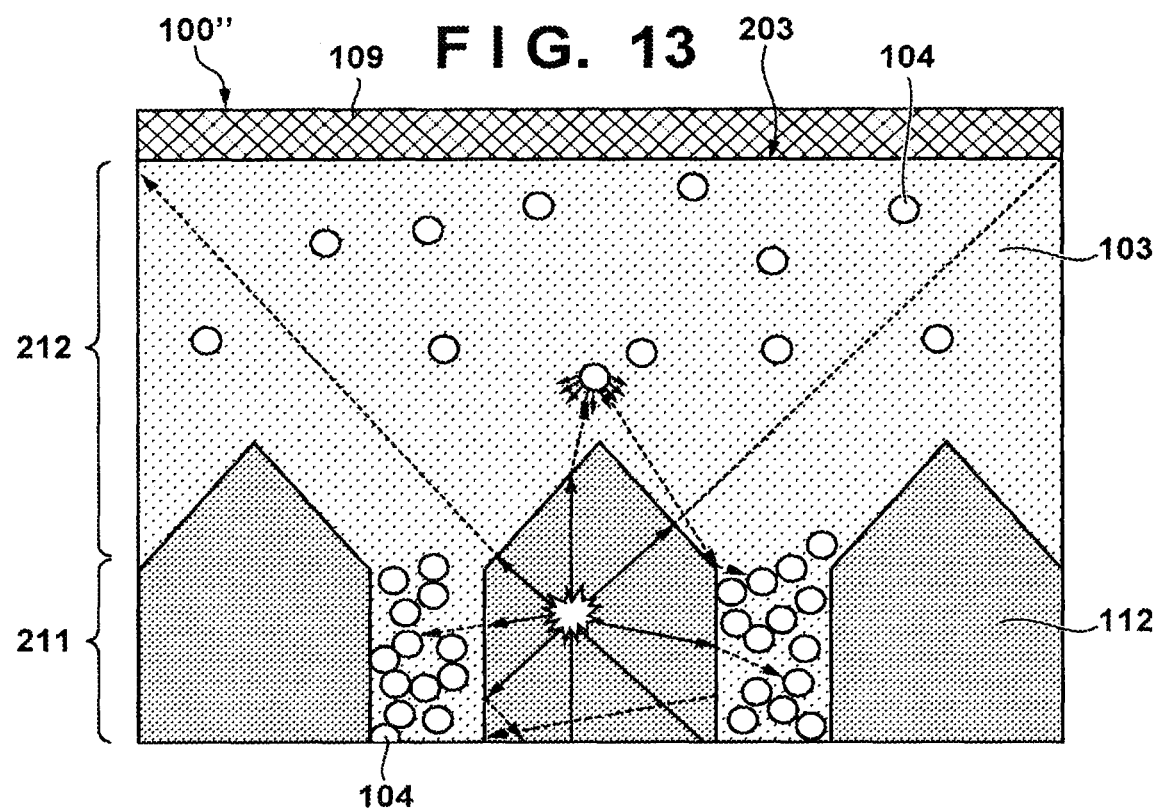
FIG. 13 is a view showing the arrangement of the radiation imaging panel of FIG. 10.

In the arrangements shown in FIGS. 11A and 11B, the metal compound particles 104 are not arranged in the second region 212. However, as shown in FIG. 13, the metal compound particles 104 may be arranged in the second region 212. In such a case, as shown in FIG. 13, the metal compound particles 104 may be dispersed and arranged in a portion, of the resin layer 103, which is arranged in the second region 212.

Figure 14:
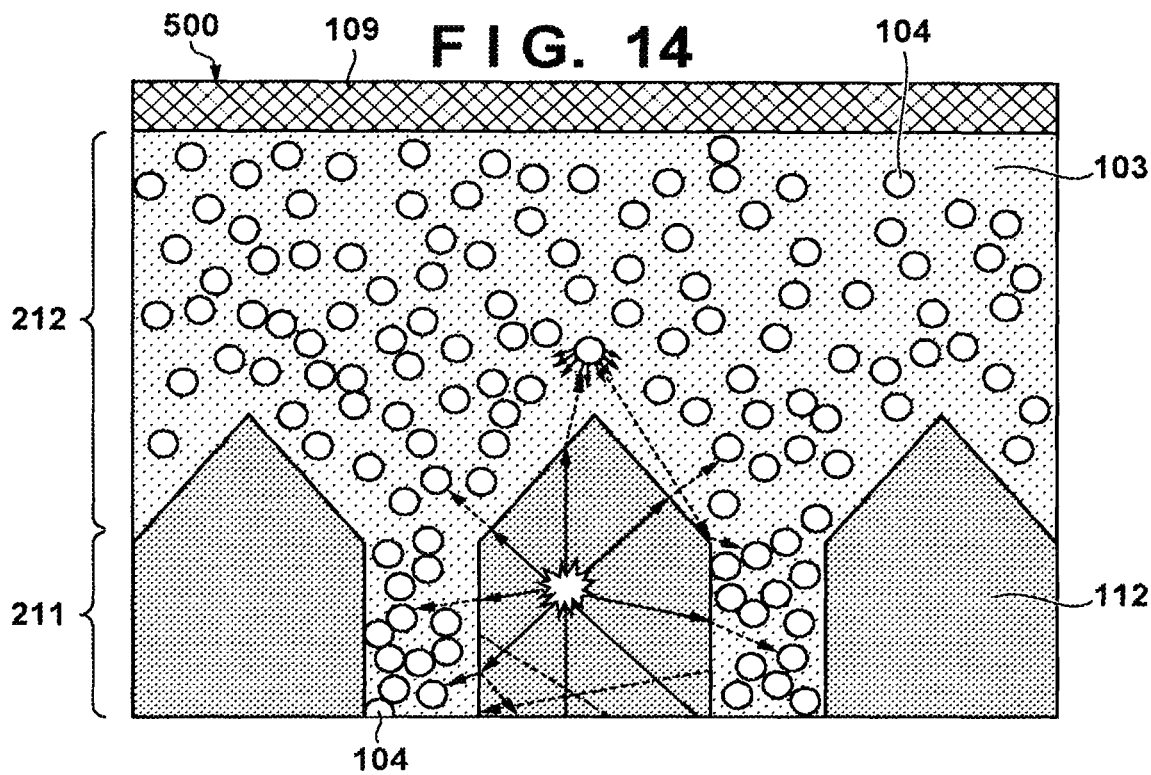
FIG. 14 is a view showing the arrangement of another comparative example of the radiation imaging panel of FIG. 10.

The concentration of the metal compound particles 104, to be arranged in the second region 212, with respect to the resin layer 103 will be considered. FIG. 13 shows the radiation imaging panel 100" according to this embodiment in which the metal compound particles 104 are added to the second region 212 at concentration lower than that of the first region 211. FIG. 14 shows a radiation imaging panel 500 according to a comparative example in which the concentration of the metal compound particles 104 in the second region 212 is equal to or higher than the concentration of the metal compound particles 104 arranged in the first region 211. If the second region 212 has a high concentration of the metal compound particles 104, the scattering of light in the film thickness direction (the vertical direction in FIG. 14) of the resin layer 103 will increase. Hence, the rays of light that will return to the columnar crystals 112 will increase. However, the rays of light reflected by the metal compound particles 104 arranged in the second region 212 may not be reflected by the columnar crystals 112 which emitted them, and may enter other columnar crystals 112. That is, the light can diffuse and become a cause of MTF degradation.

Figure 15:
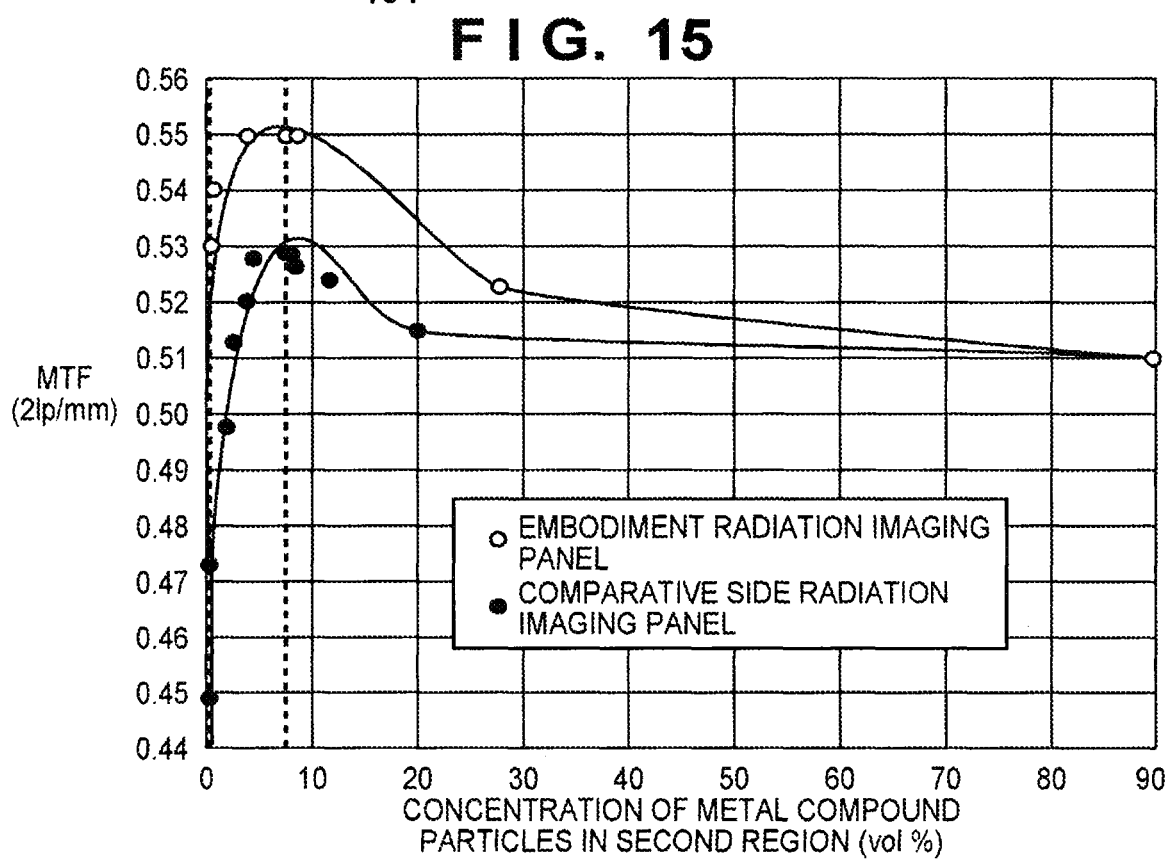
FIG. 15 is a graph showing characteristics of the radiation imaging panel of FIG. 10.

FIG. 15 is a graph showing MTF values obtained when X-ray irradiation was performed at 2 lp/mm in respective radiation imaging panels manufactured by changing the concentration of the metal compound particles 104 of the resin layer 103 in the second region 212. Since it is difficult to mix the metal compound particles 104 at a concentration exceeding 90 vol % into a resin for forming the resin layer 103, the maximum value of the concentration of the pixel region 105 in the resin layer 103 is 90 vol %. The MTF values were measured by performing X-ray irradiation in compliance with radiation quality RQA5 of the international standards. In addition, FIG. 15 shows a case (the radiation imaging panel 500 according to the comparative example) in which the metal compound particles 104 are arranged at the same concentration in the first region 211 and the second region 212, and a case (the radiation imaging panel 100" according to this embodiment) in which the metal compound particles 104 are arranged in the second region 212 at a concentration lower than that in the first region 211.

As shown in FIG. 15, compared to the radiation imaging panel 500 according to the comparative example in which the metal compound particles 104 have been added to the first region 211 and the second region 212 at the same concentration, the MTF value has improved in the radiation imaging panel 100" according to this embodiment in which the metal compound particles 104 has been added to the second region 212 at a lower concentration than that in the first region 211.

Furthermore, it can be seen from FIG. 15 that increasing the concentration of the metal compound particles 104 of the resin layer 103 in the second region 212 from 0 vol % will improve the MTF, increasing the concentration to an appropriate concentration will set the MTF to the most optimal value, and further increasing the concentration will cause the MTF to degrade. More specifically, it can be seen that the MTF value improves when the concentration of the metal compound particles 104 of the resin layer 103 in the second region 212 is 0.15 vol % or more and less than 7.5 vol %. If the concentration of the metal compound particles 104 decreases in the second region 212, the possibility that light will be reflected by the metal compound particles 104 of the resin layer 103 in the second region 212 will decrease compared to when the concentration is high, and the scattering of light will be suppressed. In addition, the presence of an appropriate amount of metal compound particles 104 will cause the rays of light reflected by the metal compound particles 104 to attenuate while being diffused. As a result, the rays of light will not return to the columnar crystals 112. This can improve the MTF of the radiation imaging panel 100" according to this embodiment.

That is, as shown in FIG. 13, in a case in which the metal compound particles 104 are to be arranged in the second region 212, it is preferable for the metal compound particles 104 to be arranged in the second region 212 at a lower concentration than in the first region 211. This will improve the MTF of the radiation imaging panel 100". Furthermore, at this time, the concentration of the metal compound particles 104 of the resin layer 103 in the second region 212 may be 0.15 vol % or more and less than 7.5 vol %. This will further improve the MTF of the radiation imaging panel 100".

In this manner, the MTF can be improved in a case in which the metal compound particles 104 are arranged in the first region 211, and the metal compound particles 104 are arranged in the second region 212 at a concentration lower than that in the first region 211 or the metal compound particles 104 are not arranged in the second region 212. As a result, it will be possible to implement the radiation imaging panel 100" which has a high spatial resolution.

A manufacturing method of the radiation imaging panel 100" in which the first region 211 and the second region 212 have different concentrations of the metal compound particles 104 will be described next. First, 550-mm×445-mm non-alkali glass having a thickness of 500 μm is prepared as the substrate 101. The substrate 101 is not limited to glass, and for example, a resin substrate or a semiconductor substrate such as silicon or the like may be used. Next, the pixel region 105 is formed by repetitively performing a deposition step of depositing a semiconductor layer such as silicon (for example, amorphous silicon) and a metal (for example, aluminum) for forming a wiring layer and the like, a photolithography step, an etching step, and the like on the glass substrate 101. A plurality of pixels, each including a light converting element for generating electric charge corresponding to the light emission of the scintillator 102 and a switching element for outputting a signal corresponding to the generated electric charge, are arranged in the pixel region 105. In addition, a connection terminal portion (not shown) for driving the pixels and for transmitting the obtained signals to an external circuit is formed in the pixel region 105.

After the pixel region 105 is formed, an array inspection for checking the operations of the pixels formed in the pixel region 105 may be performed. After confirming the fact that the photoelectric conversion elements and the switching elements are operating well and the fact that there is no defective pixel or there are only a few defective pixels, the periphery of the substrate 101 can be masked with a masking film to form the planarization layer 115 for the purpose of protecting the connection terminal portion. The planarization layer 115 can be formed by placing the substrate 101 in a spray spin coater, spinning the substrate 101 at a rotational speed of approximately 100 rpm while spraying a polyimide solution, and subsequently drying and annealing the substrate 101 at a temperature of 220° C. For example, the planarization layer 115 may have a thickness of, for example, approximately 2 μm.

After the substrate 101 in which the pixel region 105 has been formed is prepared, the scintillator 102 is formed next. First, a vapor deposition mask is set on a region, where no scintillator 102 is to be formed, of the substrate 101 on which the planarization layer 115 is formed, and the substrate 101 is placed in a vapor deposition apparatus so that the planarization layer 115 will be a vapor deposition surface. Codeposition is performed thereafter by filling cell vessels with CsI and Tl so that the Tl concentration would be 1 mol % with respect to CsI, and heating the filled cell vessels. The scintillator 102 can have a thickness of 380 μm and a film filling rate of 75%. At this time, the outer edges of the scintillator 102 can be arranged closer to the outer side than the outer edges of the pixel region 105. When performing the vapor deposition of the scintillator 102, the vapor deposition apparatus can be evacuated to $10^{-3}$ Pa, and heating can be subsequently performed by using a lamp heater so that the temperature of the surface of the substrate 101 will be 175° C.

After the scintillator 102 is formed, the metal compound particles 104 are sprayed from above the scintillator 102 so that the metal compound particles 104 will enter the spaces between the columnar crystals 112 of the scintillator 102. Next, the radiation imaging panel 100" shown in FIG. 11B is manufactured by placing a hot melt resin sheet for forming the resin layer 103 on the scintillator 102 and using a vacuum thermal transfer apparatus or the like to adhere the sheet to the scintillator 102. For example, first, the scintillator 102 and the hot melt resin sheet are brought into contact with each other at a temperature of 30° C., and air bubbles are subsequently removed by lowering the pressure to $10^{-1}$ Pa. Furthermore, the temperature is increased to 70° C. to 100° C. while applying pressure between the substrate 101 and the hot melt resin sheet which forms the resin layer 103, and the substrate 101 on which the scintillator 102 was formed and the resin layer 103 which forms the protective layer 108 are adhered to each other by maintaining this pressure applied state for an appropriate time.

In addition, for example, after the scintillator 102 is formed, a portion, of the resin layer 103, which is to be arranged in the first region 211 may be formed by coating and covering the scintillator 102 with a resin added with the metal compound particles 104. Next, a hot melt resin sheet or a sheet containing an acrylic resin or a urethane resin described above which is a so-called adhesive having a pressure-sensitive adhesiveness obtained by an intermolecular force is adhered onto the resin formed by using a coating method. As a result, the portion, of the resin layer 103, which is to be arranged in the second region 212 is formed. At this time, the metal compound particles 104 can be added to the resin, which is to be adhered onto the resin formed by using the coating method, at a concentration lower than that of the resin formed by using the coating method. This will allow radiation imaging panel 100" shown in FIG. 13 to be manufactured. In addition, the metal compound particles 104 may not be added to the resin to be adhered onto the resin formed by using the coating method. This will allow the radiation imaging panel 100" shown in FIG. 11A to be formed.

The formation method of the portion, of the resin layer 103, which is arranged in the first region 211 need not be limited to the coating method. A portion, of the resin layer 103, which is arranged in the first region 211 and is to be in contact with the columnar crystals 112 may be formed by using a vacuum thermal transfer apparatus or the like to adhere a resin added with the metal compound particles 104.

After the resin layer 103 is formed, the metal layer 109 made of aluminum or the like and the base 110 may be formed on the resin layer 103. The hot melt resin sheet or the sheet containing an acrylic resin or a urethane resin which is a so-called adhesive described above may be manufactured by forming the metal layer 109 made of aluminum or the like on the base 110 and forming the resin on the metal layer 109. A PET substrate or the like can be used as the base 110. For example, the metal layer 109 which is made of aluminum and has a thickness of 12 μm can be formed on the PET base 110 which has a thickness of 30 μm, and the resin layer 103 or a portion of the resin layer 103 can be formed on the metal layer 109. Subsequently, by adhering the resin layer 103 formed on the base 110 onto the scintillator 102, the radiation imaging panel 100" that includes the protective layer 108 as shown in FIG. 10 can manufactured.

In addition, a case using the substrate 101 including the pixel region 105 where a plurality of pixels are arranged has been explained in each embodiment and each example described above. However, the present invention is not limited to this. For example, the substrate 101 need not include the pixel region 105. In this case, the member denoted by reference numeral "100" can be called a scintillator plate. For example, when this scintillator plate is mounted on a sensor substrate including a pixel region where a plurality of pixels are arranged, the resultant structure can function as a radiation imaging panel. When the substrate 101 does not include the pixel region 105, therefore, the substrate 101 can be a transparent substrate that transmits light emitted by the scintillator 102. In such a case, a material, such as glass, a resin, or the like, which transmits light converted from radiation that entered the scintillator 102 can be used as the substrate 101.

Figure 16:
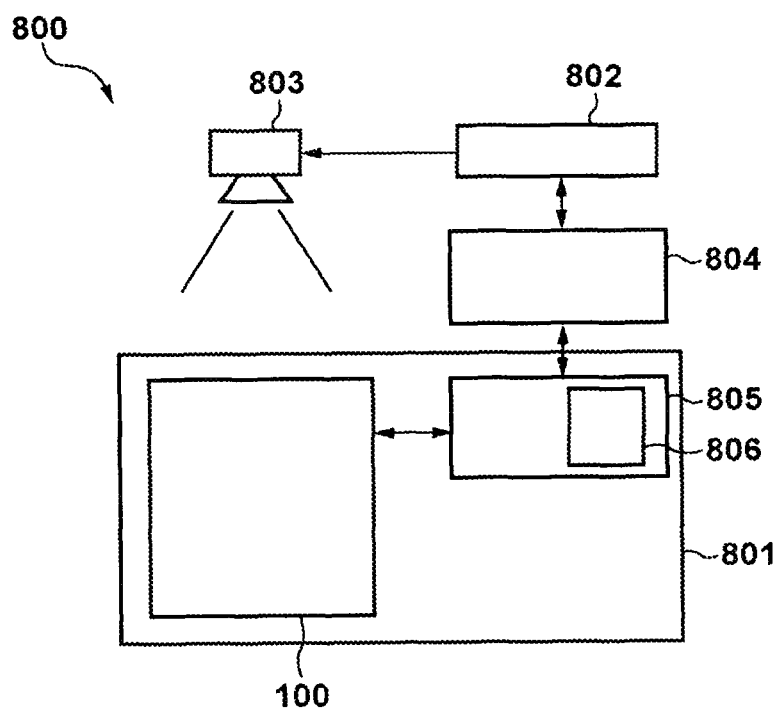
FIG. 16 is a view showing an example of a radiation imaging apparatus using the radiation imaging panel of FIG. 1, 7, or 10 and a radiation imaging system.

A radiation imaging apparatus incorporating the radiation imaging panel 100, 100', or 100" described above and a radiation imaging system 800 using this radiation imaging apparatus incorporating the radiation imaging panel 100, 100', or 100" will be explained below with reference to FIG. 16.

The radiation imaging system 800 is so configured as to electrically capture an optical image formed by a radiation, thereby obtaining an electrical radiation image (that is, radiation image data). The radiation imaging system 800 includes, for example, a radiation imaging apparatus 801, an exposure controller 802, a radiation source 803, and a computer 804.

The radiation source 803 for emitting a radiation to the radiation imaging apparatus 801 starts emitting radiation in accordance with an exposure command from the exposure controller 802. This radiation emitted from the radiation source 803 irradiates the radiation imaging apparatus 801 through an object to be inspected (not shown). The radiation source 803 stops emitting the radiation in accordance with a stop command from the exposure controller 802.

The radiation imaging apparatus 801 includes the above-described radiation imaging panel 100, 100', or 100", a controller 805 for controlling the radiation imaging panel 100, 100', or 100", and a signal processor 806 for processing signals output from the radiation imaging panel 100, 100', or 100". As an example, the signal processor 806 can perform A/D conversion on a signal output from the radiation imaging panel 100, 100', or 100", and output the signal as radiation image data to the computer 804. As another example, the signal processor 806 can also generate a stop signal for stopping the emission of a radiation from the radiation source 803, based on a signal output from the radiation imaging panel 100. This stop signal is supplied to the exposure controller 802 via the computer 804, and the exposure controller 802 transmits a stop command to the radiation source 803 in response to the stop signal.

The controller 805 can be a PLD (the abbreviation of a Programmable Logic Device) such as an FPGA (the abbreviation of a Field Programmable Gate Array), an ASIC (the abbreviation of an Application Specific Integrated Circuit), a general-purpose computer in which a program is installed, or a combination of all or some of these components.

In this embodiment, the signal processor 806 is arranged in the controller 805 or shown as one function of the controller 805. However, the present invention is not limited to this. The controller 805 and the signal processor 806 can also be separate units. Furthermore, the signal processor 806 can also be arranged outside the radiation imaging apparatus 801. For example, the computer 804 can have the function of the signal processor 806. Accordingly, the signal processor 806 can also be contained in the radiation imaging system 800, as a signal processing device for processing signals output from the radiation imaging apparatus 801.

The computer 804 can control the radiation imaging apparatus 801 and the exposure controller 802, and can perform a process of receiving radiation image data from the radiation imaging apparatus 801 and displaying the data as a radiation image. The computer 804 can also function as an input unit by which the user inputs conditions for capturing a radiation image.

As an example, the exposure controller 802 has an exposure switch, and, when the user turns on this exposure switch, transmits an exposure command to the radiation source 803, and transmits a start notification indicating the start of emission of a radiation to the computer 804. The computer 804 having received the start notification notifies the controller 805 of the radiation imaging apparatus 801 of the start of emission of a radiation in response to the start notification. In response to this notification, the controller 805 causes the radiation imaging panel 100, 100', or 100" to generate a signal corresponding to the incident radiation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-126726, filed Jul. 27, 2020, Japanese Patent Application No. 2020, 2020-143836, filed Aug. 27, 2020, and Japanese Patent Application No. 2020-143837, filed Aug. 27, 2020, which are hereby incorporated by reference herein in their entirety.

What is claimed is:

1. A radiation imaging panel comprising a substrate in which a plurality of pixels each including a photoelectric conversion element are arranged, a scintillator containing a plurality of columnar crystals arranged on the substrate, and a protective layer,
   wherein
   the protective layer includes a first resin layer arranged so as to cover the scintillator and a second resin layer arranged on the first resin layer,
   the first resin layer contains a resin and particles of a metal compound,
   a light reflectance r1 [%] of the first resin layer satisfies 47%<r1<75%,
   a light reflectance r2 [%] of the second resin layer and a light absorptance a2 [%] of the second resin layer satisfy r2<a2, and
   wherein a concentration of the particles of the metal compound in the first resin layer is 0.15 vol % to less than 7.5 vol %.

2. The panel according to claim 1, wherein the light reflectance r1 and the light reflectance r2 satisfy r1>r2.

3. The panel according to claim 1, wherein a refractive index n1 of the first resin layer and a refractive index n2 of the second resin layer satisfy n1≥n2.

4. The panel according to claim 1, wherein the metal compound contains a metal oxide.

5. The panel according to claim 1, wherein the metal compound contains rutile-type titanium dioxide.

6. The panel according to claim 1, wherein the second resin layer contains carbon black.

7. The panel according to claim 1, wherein at least one of the first resin layer or the second resin layer contains a nonvolatile thermoplastic resin.

8. The panel according to claim 7, wherein the nonvolatile thermoplastic resin contains a hot melt resin.

9. The panel according to claim 1, wherein at least one of the first resin layer or the second resin layer contains a resin having pressure-sensitive adhesiveness obtained by an intermolecular force.

10. The panel according to claim 9, wherein the resin having pressure-sensitive adhesiveness includes at least one of a urethane resin or an acrylic resin.

11. The panel according to claim 1, wherein the first resin layer and the second resin layer contain resins that have the same chemical composition.

12. The panel according to claim 1, wherein the light absorptance a2 [%] satisfies 20%<a2<72%.

13. The panel according to claim 1, wherein the light absorptance a2 [%] satisfies 50%<a2<72%.

14. The panel according to claim 1, wherein an average particle size of the particles is 200 nm to 500 nm.

15. The panel according to claim 1, wherein the scintillator contains cesium iodide.

16. The panel according to claim 1, wherein the protective layer further includes a base arranged above the second resin layer and a metal layer arranged between the second resin layer and the base.

17. A radiation imaging apparatus comprising:
the radiation imaging panel according to claim 1; and
a controller configured to control the radiation imaging panel.

18. A radiation imaging system comprising:
the radiation imaging apparatus according to claim 17; and
a signal processing apparatus configured to process a signal output from the radiation imaging apparatus.

19. A scintillator plate comprising a substrate, a scintillator containing a plurality of columnar crystals arranged on the substrate, and a protective layer,
wherein
the protective layer includes a first resin layer arranged so as to cover the scintillator and a second resin layer arranged on the first resin layer,
the first resin layer contains a resin and particles of a metal compound,
a light reflectance r1 [%] of the first resin layer satisfies 47%<r1<75%,
a light reflectance r2 [%] of the second resin layer and a light absorptance a2 [%] satisfy r2<a2, and
wherein a concentration of the particles of the metal compound in the first resin layer is 0.15 vol % to less than 7.5 vol %.

20. The plate according to claim 19, wherein the substrate is a transparent substrate configured to transmit light emitted by the scintillator.

21. A radiation imaging panel comprising a substrate in which a plurality of pixels each including a photoelectric conversion element are arranged, a scintillator containing a plurality of columnar crystals arranged on the substrate, and a protective layer,
wherein
the protective layer includes a first resin layer arranged so as to cover the scintillator and a second resin layer arranged on the first resin layer,
each of the first resin layer and the second resin layer contains particles of a metal compound,
an average particle diameter $d_1$ of the particles contained in the first resin layer is a particle diameter which causes Rayleigh scatting of light of a peak wavelength emitted from the scintillator, and
an average particle diameter $d_2$ of the particles contained in the second resin layer is a particle diameter which causes Mie scatting of the light of the peak wavelength emitted from the scintillator.

22. The panel according to claim 21, wherein when a range of light emitted by the scintillator from a side of a short wavelength to a side of a long wavelength is defined as a range from $\lambda_1$ to $\lambda_2$, the average particle diameter $d_1$ satisfies $\lambda_1/2 < d_1 < \lambda_2/2$.

23. The panel according to claim 21, wherein the average particle diameter $d_1$ is 200 nm to 400 nm.

24. The panel according to claim 21, wherein letting $\lambda$ be a peak wavelength of light emitted by the scintillator, the average particle diameter $d_2$ satisfies $d_2 \geq \lambda$.

25. The panel according to claim 21, wherein the average particle diameter $d_2$ is 550 nm to 1000 nm.

26. The panel according to claim 21, wherein a concentration of the particles of the metal compound in the first resin layer is 0.15 vol % to less than 7.5 vol %.

27. The panel according to claim 21, wherein a concentration of the particles of the metal compound in the second resin layer is not less than 0.15 vol %.

28. The panel according to claim 21, wherein a thickness from a vertex portion of each of the plurality of columnar crystals of the first resin layer to an upper surface of the first resin layer is 10 µm to less than 30 µm.

29. The panel according to claim 21, wherein letting n1 be a refractive index of the first resin layer and n2 be a refractive index of the second resin layer, n1≥n2 is satisfied.

30. The panel according to claim 21, wherein the metal compound contains a metal oxide.

31. The panel according to claim 21, wherein the metal compound contains rutile-type titanium dioxide.

32. The panel according to claim 21, wherein at least one of the first resin layer or the second resin layer contains a nonvolatile thermoplastic resin.

33. The panel according to claim 32, wherein the nonvolatile thermoplastic resin contains a hot melt resin.

34. The panel according to claim 21, wherein at least one of the first resin layer or the second resin layer contains a resin having pressure-sensitive adhesiveness obtained by an intermolecular force.

35. The panel according to claim 34, wherein the resin having pressure-sensitive adhesiveness includes at least one of a urethane resin or an acrylic resin.

36. The panel according to claim 21, wherein the first resin layer and the second resin layer contain resins that have the same chemical composition.

37. The panel according to claim 21, wherein the particles of the metal compound in the first resin layer and the particles of the metal compound in the second resin layer contain compounds that have the same chemical composition.

38. The panel according to claim 21, wherein the scintillator contains cesium iodide.

39. The panel according to claim 21, wherein the protective layer further includes a base arranged above the second resin layer and a metal layer arranged between the second resin layer and the base.

40. A radiation imaging apparatus comprising:
the radiation imaging panel according to claim 21; and
a controller configured to control the radiation imaging panel.

41. A radiation imaging system comprising:
the radiation imaging apparatus according to claim 40; and
a signal processing apparatus configured to process a signal output from the radiation imaging apparatus.

42. A scintillator plate comprising a substrate, a scintillator containing a plurality of columnar crystals arranged on the substrate, and a protective layer,
wherein
the protective layer includes a first resin layer arranged so as to cover the scintillator and a second resin layer arranged on the first resin layer,
particles of a metal compound are contained in each of the first resin layer and the second resin layer,
an average particle diameter $d_1$ of the particles contained in the first resin layer is a particle diameter which causes Rayleigh scatting of light of a peak wavelength emitted from the scintillator, and
an average particle diameter $d_2$ of the particles contained in the second resin layer is a particle diameter which causes Mie scatting of the light of the peak wavelength emitted from the scintillator.

43. The plate according to claim 42, wherein the substrate is a transparent substrate configured to transmit light emitted by the scintillator.

44. A radiation imaging panel comprising a substrate formed by arranging a plurality of pixels each including a photoelectric conversion element on a principal surface, a scintillator containing a plurality of columnar crystals arranged on the principal surface, and a protective layer including a resin layer arranged so as to cover the scintillator, wherein a region between the principal surface and an upper surface of the resin layer includes a first region, which is a region between adjacent columnar crystals of the plurality of columnar crystals, and a second region, which is a region where the resin layer is to be arranged and is between the upper surface and the plurality of columnar crystals and the first region, particles of a metal compound are contained in the first region, and the particles of the metal compound are contained in the second region at a concentration lower than that of the first region or the particles of the metal compound are not contained in the second region.

45. The panel according to claim 44, wherein the resin layer is not arranged in the first region.

46. The panel according to claim 44, wherein a portion of the resin layer is arranged in the first region.

47. The panel according to claim 44, wherein in the second region, the concentration of the particles of the metal compound in the resin layer is 0.15 vol % to less than 7.5 vol %.

48. The panel according to claim 44, wherein the particles of the metal compound are dispersed in a portion of the resin layer, which is arranged in the second region.

49. The panel according to claim 44, wherein a refractive index of the particles of the metal compound is higher than a refractive index of a resin forming the resin layer.

50. The panel according to claim 44, wherein the metal compound contains a metal oxide.

51. The panel according to claim 44, wherein the metal compound contains rutile-type titanium dioxide.

52. The panel according to claim 44, wherein the plurality of columnar crystals contain alkali metal halide.

53. The panel according to claim 44, wherein the resin layer contains at least one of a resin made of a nonvolatile thermoplastic material or a resin having pressure-sensitive adhesiveness obtained by an intermolecular force.

54. The panel according to claim 44, wherein the first region is a region in which a ratio occupied by the plurality of columnar crystals in a plane parallel to the principle surface is 75% to 98%.

55. The panel according to claim 44, wherein an average particle size of the particles is 200 nm to 500 nm.

56. The panel according to claim 44, wherein the protective layer further includes a base arranged above a side of the resin layer, which is opposite to the scintillator, and a metal layer arranged between the resin layer and the base.

57. A radiation imaging apparatus comprising:
the radiation imaging panel according to claim 44; and
a controller configured to control the radiation imaging panel.

58. A radiation imaging system comprising:
the radiation imaging apparatus according to claim 57; and a signal processing apparatus configured to process a signal output from the radiation imaging apparatus.

59. A scintillator plate comprising a substrate, a scintillator containing a plurality of columnar crystals arranged on a principal surface of the substrate, and a protective layer including a resin layer arranged so as to cover the scintillator, wherein a region between the principal surface and an upper surface of the resin layer includes a first region, which is a region between adjacent columnar crystals of the plurality of columnar crystals, and a second region, which is a region where the resin layer is to be arranged and is between the upper surface and the plurality of columnar crystals and the first region, particles of a metal compound are contained in the first region, and the particles of the metal compound are contained in the second region at a concentration lower than that of the first region or the particles of the metal compound are not contained in the second region.

60. The plate according to claim 59, wherein the substrate is a transparent substrate configured to transmit light emitted by the scintillator.

61. A radiation imaging panel
comprising a substrate in which a plurality of pixels each including a photoelectric conversion element are arranged, a scintillator containing a plurality of columnar crystals arranged on the substrate, and a protective layer, wherein the protective layer includes a first resin layer arranged so as to cover the scintillator and a second resin layer arranged on the first resin layer, the first resin layer contains a resin and particles of a metal compound, a light reflectance r1 [%] of the first resin layer satisfies 47%<r1<75%, a light reflectance r2 [%] of the second resin layer and a light absorptance a2 [%] of the second resin layer satisfy r2<a2, and wherein a thickness from a vertex portion of each of the plurality of columnar crystals of the first resin layer to an upper surface of the first resin layer is 10 μm to less than 30 μm.

62. The panel according to claim 61, wherein the light reflectance r1 and the light reflectance r2 satisfy r1>r2.

63. The panel according to claim 61, wherein a refractive index n1 of the first resin layer and a refractive index n2 of the second resin layer satisfy n1≥n2.

64. The panel according to claim 61, wherein the metal compound contains a metal oxide.

65. The panel according to claim 61, wherein the metal compound contains rutile-type titanium dioxide.

66. The panel according to claim 61, wherein the second resin layer contains carbon black.

67. The panel according to claim 61, wherein at least one of the first resin layer or the second resin layer contains a nonvolatile thermoplastic resin.

68. The panel according to claim 67, wherein the nonvolatile thermoplastic resin contains a hot melt resin.

69. The panel according to claim 61, wherein at least one of the first resin layer or the second resin layer contains a resin having pressure-sensitive adhesiveness obtained by an intermolecular force.

70. The panel according to claim 69, wherein the resin having pressure-sensitive adhesiveness includes at least one of a urethane resin or an acrylic resin.

71. The panel according to claim 61, wherein the first resin layer and the second resin layer contain resins that have the same chemical composition.

72. The panel according to claim 61, wherein the light absorptance a2 [%] satisfies 20%<a2<72%.

73. The panel according to claim 61, wherein the light absorptance a2 [%] satisfies 50%<a2<72%.

74. The panel according to claim 61, wherein an average particle size of the particles is 200 nm to 500 nm.

75. The panel according to claim 61, wherein the scintillator contains cesium iodide.

76. The panel according to claim 61, wherein the protective layer further includes a base arranged above the second resin layer and a metal layer arranged between the second resin layer and the base.

77. A radiation imaging apparatus comprising:
the radiation imaging panel according to claim 65; and
a controller configured to control the radiation imaging panel.

78. A radiation imaging system comprising:
the radiation imaging apparatus according to claim 77; and
a signal processing apparatus configured to process a signal output from the radiation imaging apparatus.

79. A scintillator plate comprising a substrate, a scintillator containing a plurality of columnar crystals arranged on the substrate, and a protective layer,
wherein
the protective layer includes a first resin layer arranged so as to cover the scintillator and a second resin layer arranged on the first resin layer,
the first resin layer contains a resin and particles of a metal compound,
a light reflectance r1 [%] of the first resin layer satisfies 47%<r1<75%,
a light reflectance r2 [%] of the second resin layer and a light absorptance a2 [%] satisfy r2<a2, and
wherein a thickness from a vertex portion of each of the plurality of columnar crystals of the first resin layer to an upper surface of the first resin layer is 10 μm to less than 30 μm.

80. The plate according to claim 79, wherein the substrate is a transparent substrate configured to transmit light emitted by the scintillator.

* * * * *